US011871399B2

(12) United States Patent
Khoryaev et al.

(10) Patent No.: US 11,871,399 B2
(45) Date of Patent: Jan. 9, 2024

(54) USER EQUIPMENT (UE) AND METHODS FOR VEHICLE-TO-VEHICLE (V2V) SIDELINK COMMUNICATION IN ACCORDANCE WITH A SHORT TRANSMISSION TIME INTERVAL (TTI)

(71) Applicant: Apple Inc., Cupertino, CA (US)

(72) Inventors: Alexey Khoryaev, Nizhny Novgorod (RU); Mikhail Shilov, Nizhny Novgorod (RU); Seunghee Han, San Jose, CA (US); Sergey Panteleev, Nizhny Novgorod (RU); Sergey Sosnin, Zavolzhie (RU); Pavel Dyakov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/901,329

(22) Filed: Sep. 1, 2022

(65) Prior Publication Data

US 2022/0417946 A1    Dec. 29, 2022

Related U.S. Application Data

(63) Continuation of application No. 16/496,321, filed as application No. PCT/US2018/023477 on Mar. 21, 2018, now Pat. No. 11,452,115.
(Continued)

(51) Int. Cl.
*H04W 72/12* (2023.01)
*H04W 4/44* (2018.01)
(Continued)

(52) U.S. Cl.
CPC ........... *H04W 72/12* (2013.01); *H04L 5/0087* (2013.01); *H04W 4/44* (2018.02); *H04W 92/18* (2013.01)

(58) Field of Classification Search
CPC ....... H04W 72/12; H04W 4/44; H04W 92/18; H04L 5/0087
(Continued)

(56) References Cited

U.S. PATENT DOCUMENTS

2014/0112175 A1\* 4/2014 Pantelidou ............ H04W 28/26
                                                                    370/252
2014/0328235 A1    11/2014 Merlin
(Continued)

FOREIGN PATENT DOCUMENTS

CN    101663852        3/2010
CN    106507497        3/2017
WO    2016175631 A1    11/2016

OTHER PUBLICATIONS

Extended European Search Report for EP Patent Application No. 22197508.9; 10 pages; dated Nov. 30, 2022.
(Continued)

*Primary Examiner* — Obaidul Huq
(74) *Attorney, Agent, or Firm* — Kowert, Hood, Munyon, Rankin & Goetzel, P.C.

(57) ABSTRACT

Embodiments of a User Equipment (UE) and methods for communication are generally described herein. The UE may select, from a plurality of short transmission time intervals (TTIs), a short TTI for a vehicle-to-vehicle (V2V) sidelink transmission by the UE. The short TTIs may occur within a legacy TTI. The short TTIs may be allocated for V2V sidelink transmissions by non-legacy UEs. The legacy TTI may be allocated for V2V sidelink transmissions by legacy UEs. The UE may transmit, in accordance with the legacy TTI, a legacy physical sidelink control channel (PSCCH) to indicate, to legacy UEs, the V2V sidelink transmission by the UE. The UE may transmit, in accordance with the
(Continued)

selected short TTI, a short PSCCH (sPSCCH) to indicate, to non-legacy UEs, the V2V sidelink transmission by the UE.

20 Claims, 25 Drawing Sheets

Related U.S. Application Data

(60) Provisional application No. 62/476,147, filed on Mar. 24, 2017, provisional application No. 62/475,690, filed on Mar. 23, 2017.

(51) Int. Cl.
 *H04L 5/00* (2006.01)
 *H04W 92/18* (2009.01)

(58) Field of Classification Search
 USPC .......................................... 370/310, 328, 329
 See application file for complete search history.

(56) References Cited

U.S. PATENT DOCUMENTS

| | | |
|---|---|---|
| 2016/0143030 A1 | 5/2016 | Lee et al. |
| 2016/0323869 A1 | 11/2016 | Xu et al. |
| 2017/0019886 A1 | 1/2017 | Patel et al. |
| 2017/0054540 A1 | 2/2017 | Kim |
| 2017/0188391 A1 | 6/2017 | Rajagopal et al. |
| 2018/0076979 A1* | 3/2018 | Lomayev ............ H04L 27/2601 |
| 2019/0075548 A1 | 3/2019 | Lee et al. |
| 2019/0116007 A1* | 4/2019 | Yi .................... H04W 72/0453 |
| 2019/0132832 A1 | 5/2019 | Uchiyama et al. |
| 2020/0029245 A1* | 1/2020 | Khoryaev ............ H04W 36/22 |
| 2020/0059897 A1 | 2/2020 | Li et al. |
| 2021/0105800 A1 | 4/2021 | Zhao et al. |
| 2021/0235499 A1 | 7/2021 | Yasukawa et al. |

OTHER PUBLICATIONS

Intel Corporation; "PSSCH DMRS genertion for sidelink V2V communication"; 3GPP TSG WG1 Meeting #87 R1-1611919; Reno, USA; Nov. 14, 2016; 3 Pages.

Partial European Search Report for Patent Application No. US2018023477; dated Apr. 9, 2020; 15 Pages.

Office Action for Chinese Patent Application No. 2018800187851; dated Feb. 24, 2023.

Qualcomm et al. "V2X Evolution: Timeline and Scope"; 3GPP RAN #75 RP-170198; Dubrovnik, Hungary; Mar. 6, 2017.

Motorola Mobility et al. "Control signaling for shortened TTI"; 3GPP TSG RAN WG1#88 R1-1703039; Athens, Greece; Feb. 13, 2017.

Motorola Mobility "Control signaling for shortened TTI"; 3GPP TSG RAN WG1#87 R1-1612741; Reno, USA; Nov. 14, 2016.

Dong et al. "Research on 5G technique and thinking of wireless network planning"; China Academic Journal Electronic Publishing House; Jan. 30, 2017.

\* cited by examiner

_US 11,871,399 B2_

USER EQUIPMENT (UE) AND METHODS FOR VEHICLE-TO-VEHICLE (V2V) SIDELINK COMMUNICATION IN ACCORDANCE WITH A SHORT TRANSMISSION TIME INTERVAL (TTI)

PRIORITY CLAIM

This application is a continuation of U.S. Ser. No. 16/496,321, filed Sep. 20, 2019, which is a U.S. National Stage Filing under 35 U.S.C. 371 from International Application No. PCT/US2018/023477, filed Mar. 21, 2018 and published in English as WO 2018/175528 on Sep. 27, 2018, which claims priority to U.S. Provisional Patent Application Ser. No. 62/475,690, filed Mar. 23, 2017, and to U.S. Provisional Patent Application Ser. No. 62/476, 147, filed Mar. 24, 2017, both each of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to sidelink communication. Some embodiments relate to vehicle-to-vehicle (V2V) communication. Some embodiments relate to transmission of signals in accordance with different transmission time intervals (TTIs), including but not limited to short TTIs and legacy TTIs.

BACKGROUND

Mobile devices may exchange data in accordance with sidelink communication. In some cases, such as when mobile devices are out of network coverage, the mobile devices may perform sidelink communication autonomously with limited or no assistance from a base station. Various use cases for sidelink communication are possible. In an example scenario, sidelink communication in accordance with a low latency may be used, which may be challenging. There is a general need for methods and systems to enable sidelink communication in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
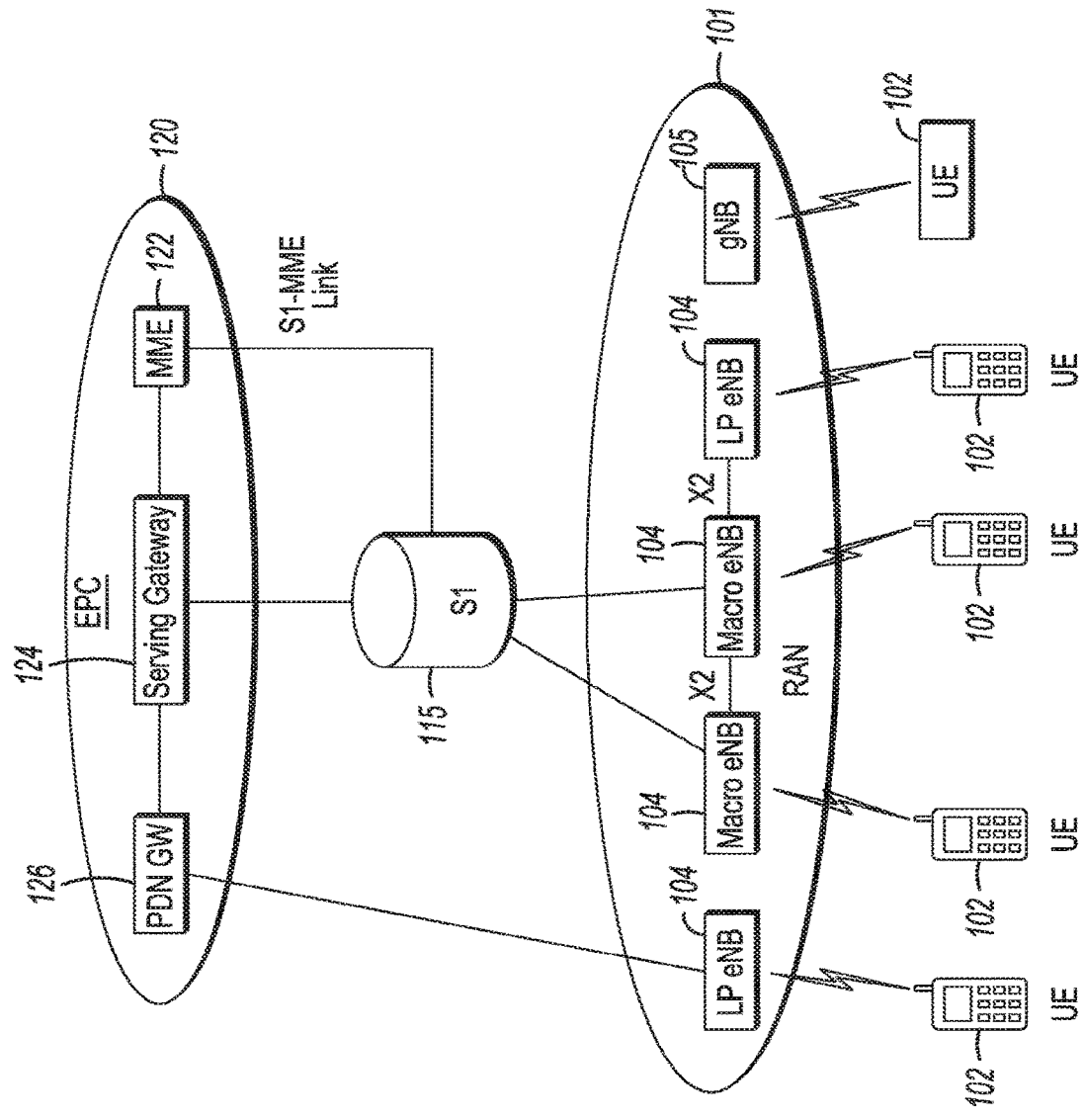
FIG. 1A is a functional diagram of an example network in accordance with some embodiments.
Figure 1B:
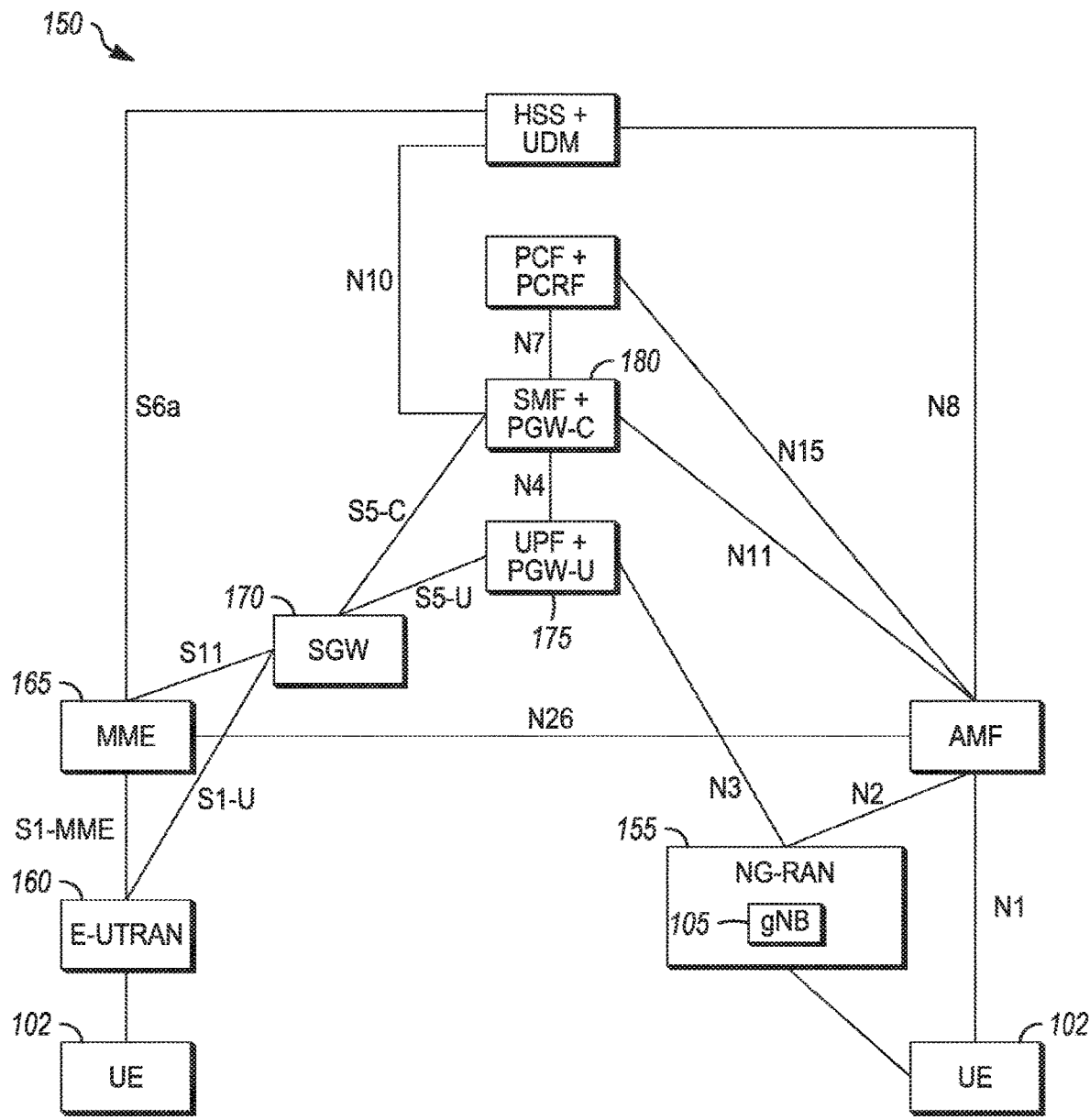
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein. "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used n some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments. UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U.

The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 105 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell as a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the POW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuity may be implemented by, one or more software or firmware modules. In some embodiments, circuitry may include logic, at least partially operable in hardware. Embodiments described herein may be implemented into a system using any suitably configured hardware and/or software.

Figure 2:
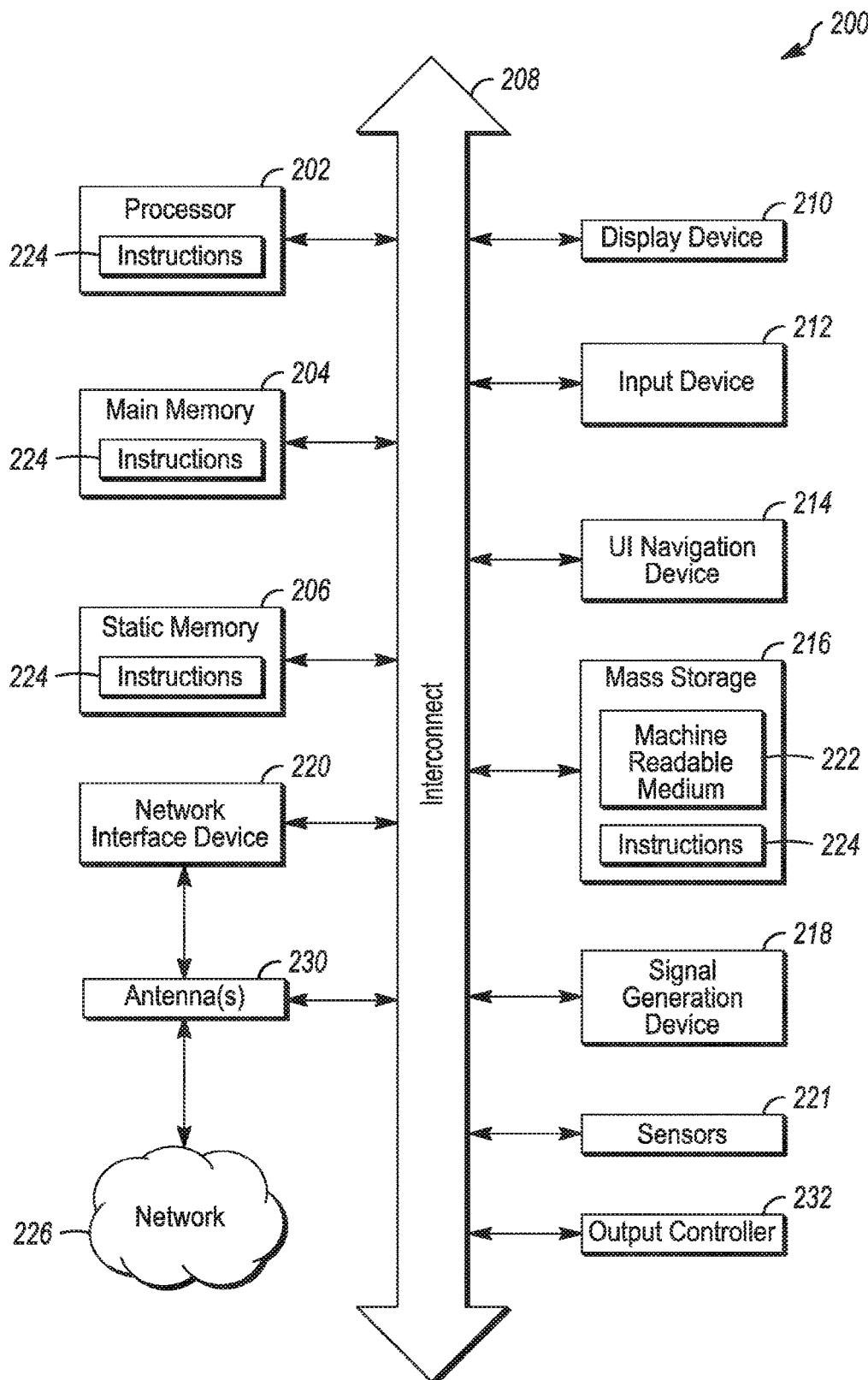
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
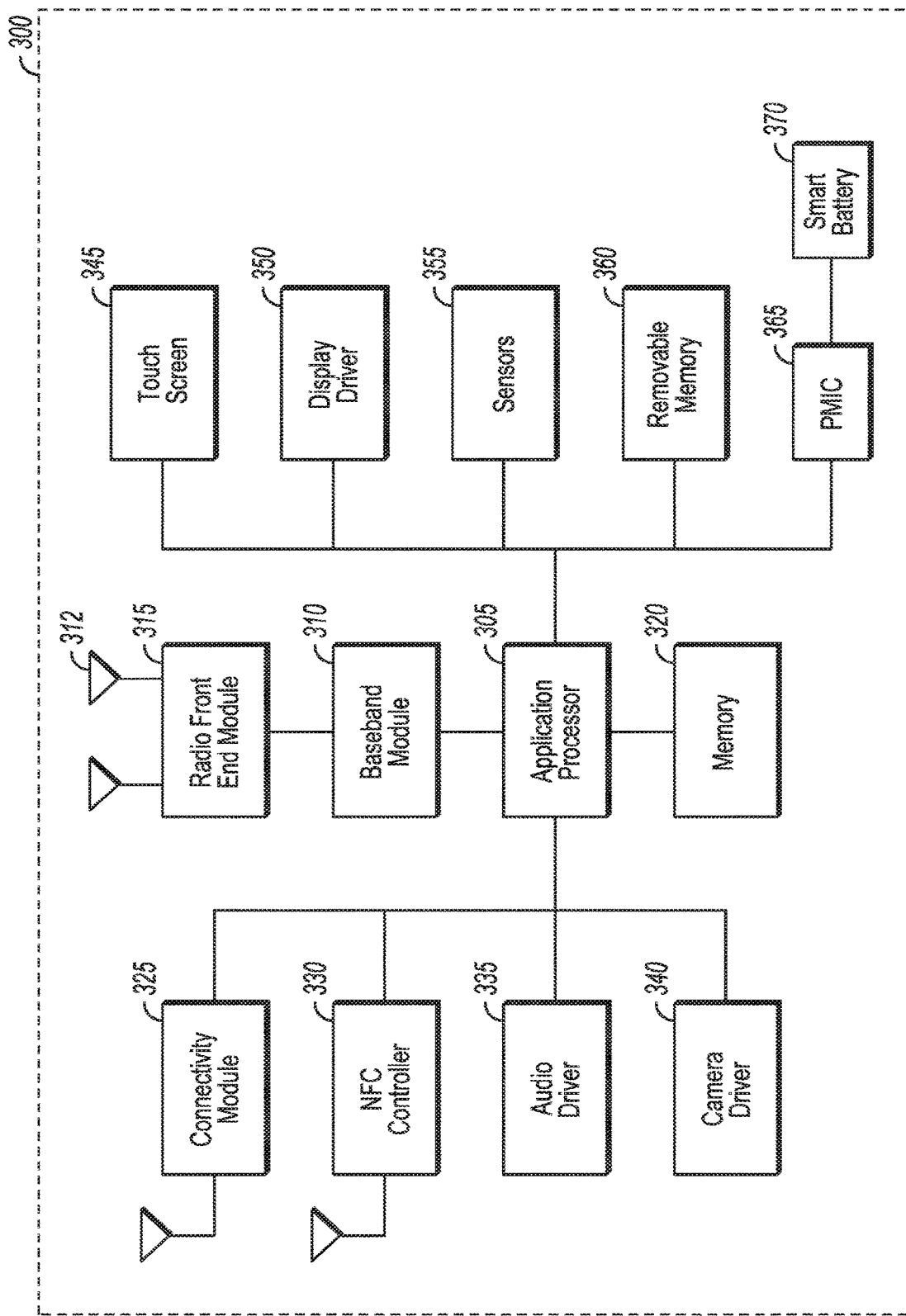
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
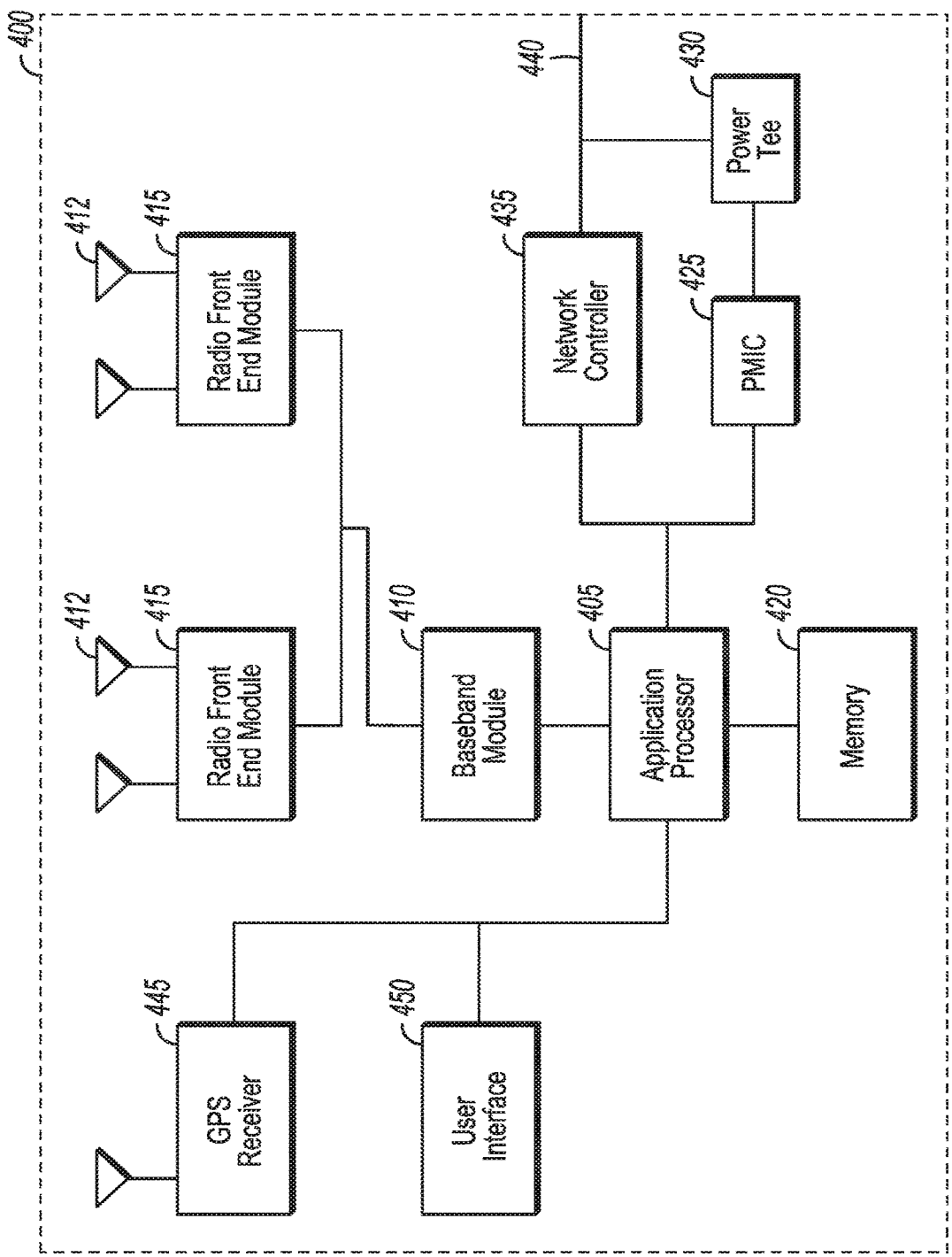
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus or a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS). Globalnaya Navigatsionnaya Sputnikovaya Sistema (GLONASS). Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
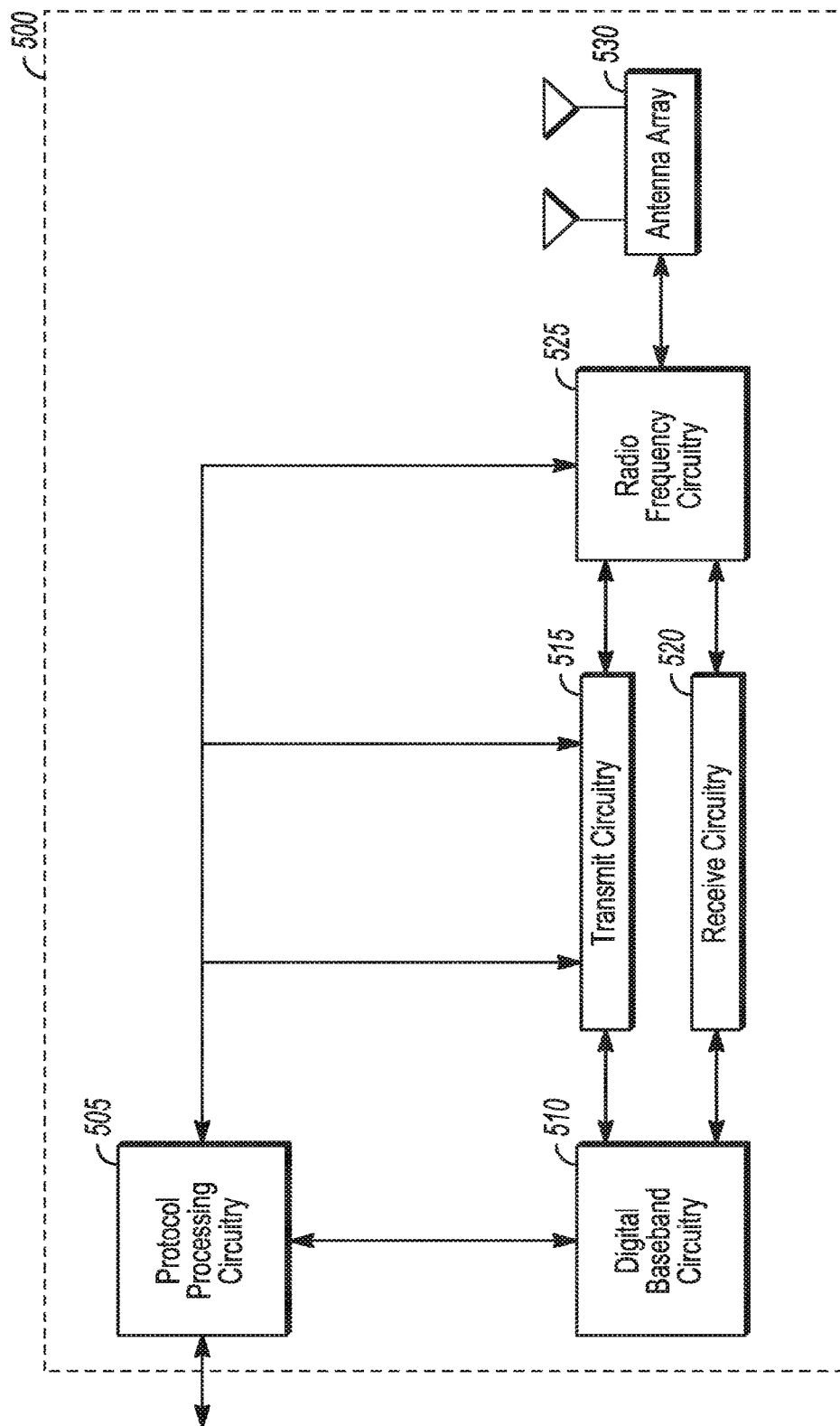
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
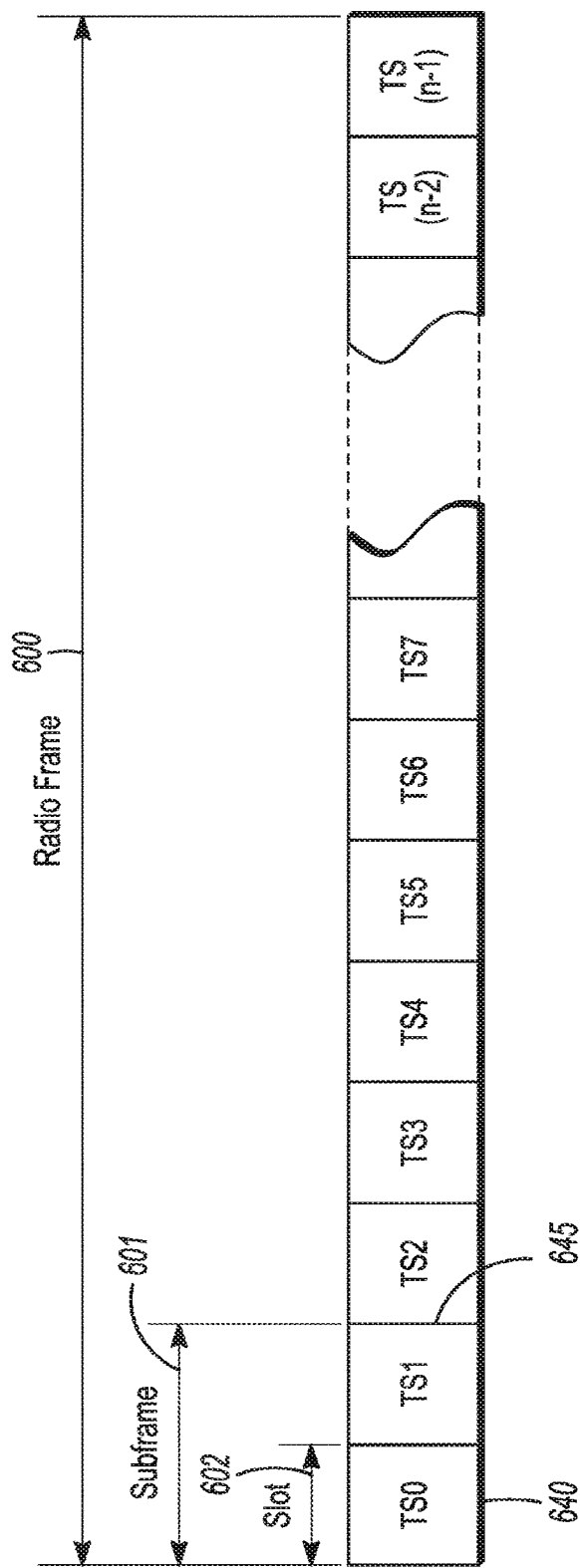
FIG. 6 illustrates an example of a radio frame structure in accordance with some embodiments.
Figure 7A:
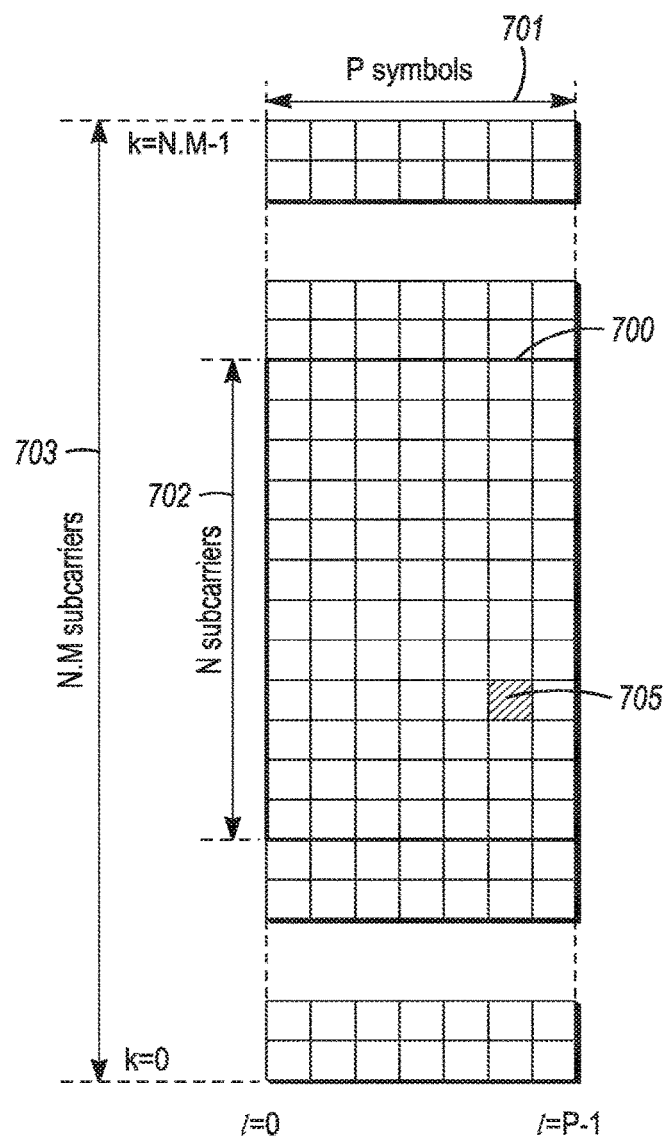
FIG. 7A and FIG. 7B illustrate example frequency resources in accordance with some embodiments.
Figure 7B:
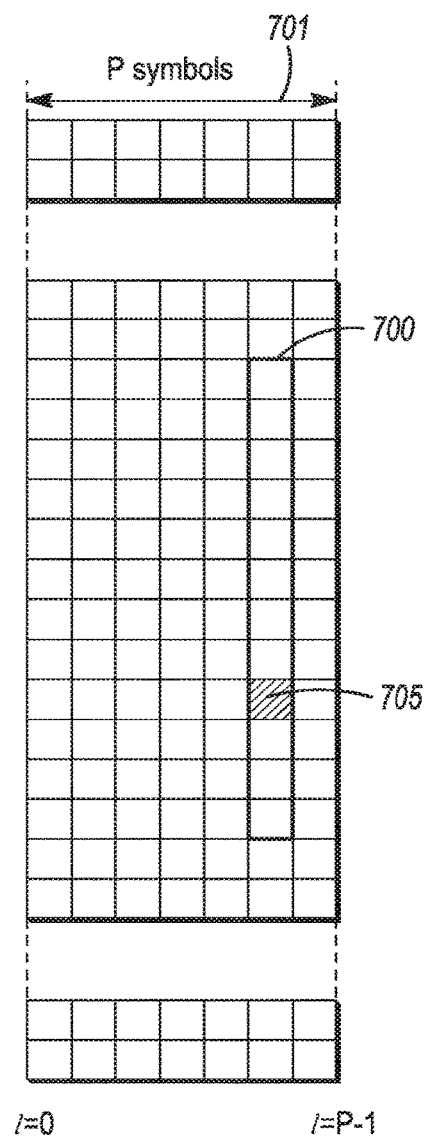

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard. NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N·M-1 (as indicated by 703), where N is the number of subcarriers in a resource block, and M is the number of resource blocks spanning a component carrier in the frequency domain.

In accordance with some embodiments, the UE 102 may select, from a plurality of short transmission time intervals (TTIs), a short TTI for a vehicle-to-vehicle (V2V) sidelink transmission b) the UE 102. The short TTIs may occur within a legacy TTI. The short TTIs may be allocated for V2V sidelink transmissions by non-legacy UEs 102. The legacy TTI may be allocated for V2V sidelink transmissions by legacy UEs 102. The UE 102 may transmit, in accordance with the legacy TTI, a legacy physical sidelink control channel (PSCCH) to indicate, to legacy UEs 102, the V2V sidelink transmission by the UE 102. The UE 102 may transmit, in accordance with the selected short TTI, a short PSCCH (sPSCCH) to indicate, to non-legacy UEs 102, the V2V sidelink transmission by the UE 102. These embodiments are described in more detail below.

Figure 8:
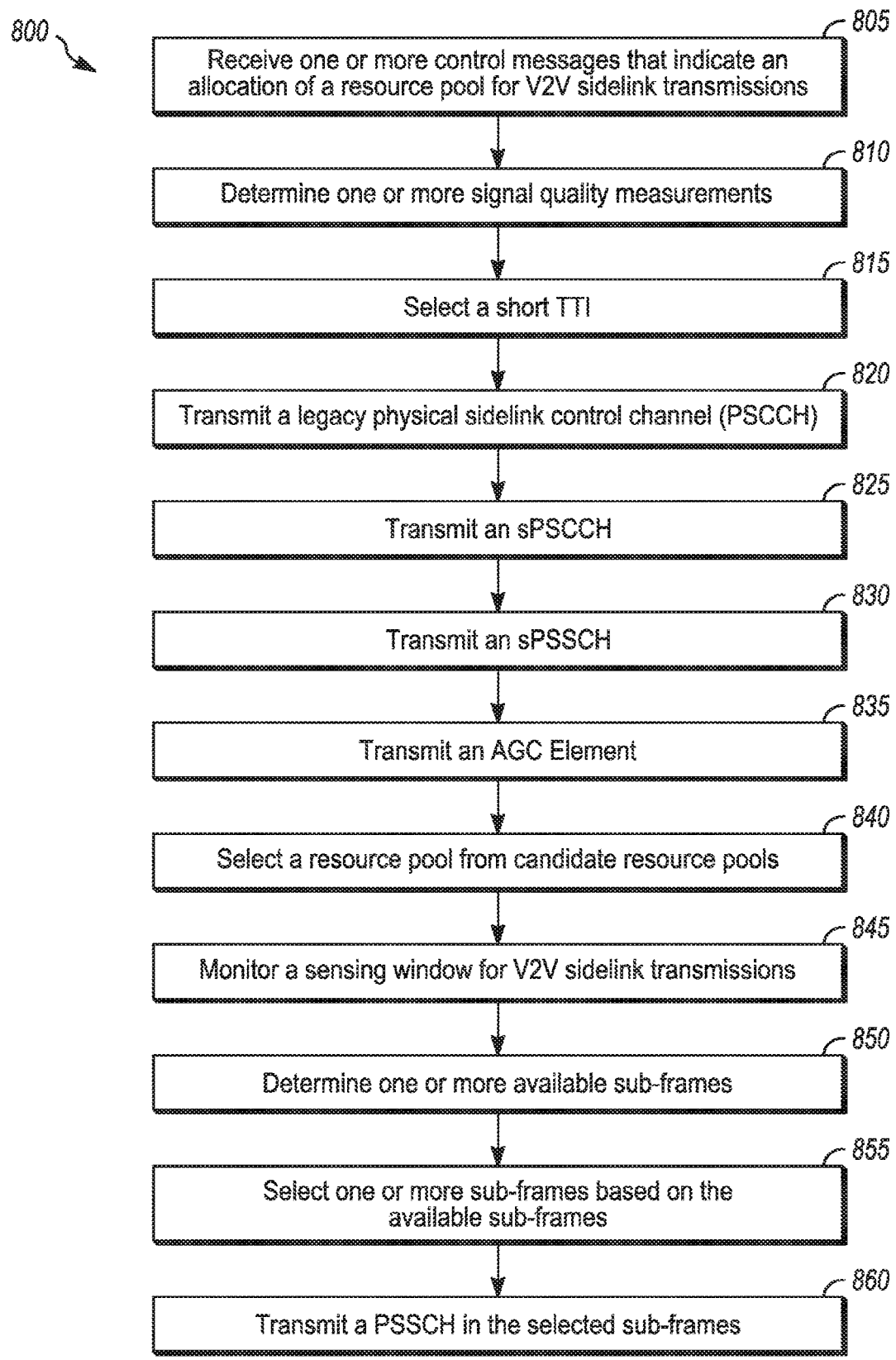
FIG. 8 illustrates the operation of a method of communication in accordance with some embodiments.

FIG. 8 illustrates the operation of a method of communication in accordance with some embodiments. In describing the method 800, reference may be made to one or more of FIGS. 1-23, although it is understood that the method 800 may be practiced with any other suitable systems, interfaces and components. In some cases, descriptions herein of one or more of the concepts, operations and/or techniques regarding one of the methods described herein (800 and/or other) may be applicable to at least one of the other methods described herein (800 and/or other).

Some embodiments of the method 800 may include additional operations in comparison to what is illustrated in FIG. 8, including but not limited to operations described herein. Some embodiments of the method 800 may not necessarily include all of the operations shown in FIG. 8. In addition, embodiments of the method 800 are not necessarily limited to the chronological order that is shown in FIG. 8. In some embodiments, a UE 102 may perform one or more operations of the method 800, but embodiments are not limited to performance of the method 800 and/or operations of it by the UE 102. Accordingly, although references may be made to performance of one or more operations of the method 800 by the UE 102 in descriptions herein, it is understood that the gNB 105 and/or eNB 104 may perform one or more operations that may be the same as, similar to and/or reciprocal to one or more of the operations of the method 800, in some embodiments.

While the method 800 and other methods described herein may refer to eNBs 104, gNBs 105 or UEs 102 operating in accordance with 3GPP standards, 5G standards. NR standards and/or other standards, embodiments of those methods are not limited to just those eNBs 104, gNBs 105 or UEs 102 and may also be practiced on other devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. The methods 800 and other methods described herein may also be applicable to an apparatus of a UE 102, an apparatus of an eNB 104, an apparatus of a gNB 105 and/or an apparatus of another device described above.

It should also be noted that embodiments are not limited by references herein (such as in descriptions of the method and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the messages described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

At operation 805, the UE 102 may receive one or more control messages that indicate an allocation of a resource pool for V2V sidelink transmissions. In some embodiments, the one or more control messages may be received from the eNB 104 and/or gNB 105, although the scope of embodiments is not limited in this respect. Any suitable control messages may be used.

In some embodiments, the one or more control messages may include information related to the allocation of the resource pool for V2V sidelink transmissions. In some embodiments, such information may be related to one or more of the operations described herein. In some embodiments, such information may be related to one or more of: transmission time intervals (TTIs), short TTIs, configuration of TTIs, configuration of short TTIs, resource pools, channel sensing, sensing window, resource selection window, resource (re)-selection window and/or other concepts (including but not limited to concepts described herein).

In some embodiments, a resource pool may be allocated for V2V sidelink transmissions. In some embodiments, multiple resource pools may be allocated for V2V sidelink transmissions. In some embodiments, the eNB 104 and/or gNB 105 may allocate the one or more resource pools, although the scope of embodiments is not limited in this respect. Accordingly, the eNB 104 and/or gNB 105 may transmit one or more control messages that indicate information related to the resource pool(s). In some embodiments, the one or more resource pools may be allocated for V2V sidelink transmissions in accordance with a 3GPP standard and/or other standard, although the scope of embodiments is not limited in this respect.

It should be noted that some embodiments may not necessarily include operation 805. In a non-limiting example, the resource pool(s) for V2V sidelink transmissions may be pre-configured, pre-defined, included in a standard and/or other. The control messages of operation 805 may not be necessary in these and other scenarios.

It should be noted that descriptions herein may refer to V2V sidelink transmissions, but embodiments are not limited to V2V sidelink transmissions. One or more of the operations and/or techniques described herein related to V2V sidelink transmissions may be applicable to sidelink transmissions that are not necessarily V2V sidelink transmissions.

In some embodiments, a resource pool may include time resources and/or frequency resources. In a non-limiting example, the resource pool may include one or more physical resource blocks (PRBs) and one or more symbol periods (including but not limited to OFDM symbol periods). In another non-limiting example, the resource pool may include one or more sub-channels and one or more sub-frames. In some embodiments, the resource pool may include contiguous frequency resources, sub-channels and/or PRBs, although the scope of embodiments is not limited in this respect. In some embodiments, the resource pool may include contiguous time resources, symbol periods and/or sub-frames, although the scope of embodiments is not limited in this respect.

It should be noted that descriptions herein of some operations and/or techniques may refer to PRBs, sub-channels, symbol periods and/or sub-frames, but such references are not limiting. In some embodiments, other time resources and/or frequency resources may be used in one or more of those operations and/or techniques.

At operation 810, the UE 102 may determine one or more signal quality or sensing measurements. Non-limiting examples of the signal quality measurements include a sidelink received signal strength indicator (S-RSSI), a received signal strength indicator (RSSI), a signal-to-noise ratio (SNR), a reference signal received power (RSRP), a reference signal received quality (RSRQ), channel busy ratio (CBR) and/or other.

At operation 815, the UE 102 may select a short transmission time interval (TTI). In some embodiments, the UE 102 may select the short TTI for a vehicle-to-vehicle (V2V) sidelink transmission by the UE 102. In some embodiments, the UE 102 may select the short TTI from a plurality of short TTIs (including but not limited to a plurality of candidate TTIs). In some embodiments, the UE 102 may select and/or use multiple short TTIs for one or more V2V sidelink transmissions by the UE 102.

In some embodiments, the short TTIs may be allocated for V2V sidelink transmissions by non-legacy UEs 102 and the legacy TTI may be allocated for V2V sidelink transmissions by legacy UEs 102. It should be noted that references to a non-legacy UE 102 are not limiting. In some embodiments, an enhanced UE 102, a UE 102 configured for NR operation, a UE 102 configured for 5G operation and/or other type of UE 102 may be used. In a non-limiting example, an operation that is performed by a non-legacy UE 102 in descriptions herein may be performed by an enhanced UE 102, a UE 102 configured for NR operation, a UE 102 configured for 5G operation and/or other type of UE 102, in some embodiments. In another non-limiting example, some scenarios may include communication between a component and a non-legacy UE 102 in descriptions herein. In some embodiments, same or similar scenarios may include communication between the component and an enhanced UE 102, a UE 102 configured for NR operation, a UE 102 configured for 5G operation and/or other type of UE 102.

In some embodiments, the UE 102 may determine one or more signal quality measurements for the plurality of short TTIs. The signal quality measurements may be determined based on one or more channel sense operations prior to the legacy TTI, although the scope of embodiments is not limited in this respect. The UE 102 may select the short TTI for the V2V sidelink transmission based at least partly on the signal quality measurements for the plurality of short TTIs.

It should be noted that references to a "short TTI" are not limiting. Such references may be used for clarity, in some cases. In some embodiments, one or more short TTIs may occur within a legacy TTI. In some embodiments, one or more short TTIs may be within a legacy TTI. In some embodiments, a legacy TTI may include multiple short TTIs. In some embodiments, a legacy TTI may be divided to include multiple short TTIs. The short TTI may be shorter than the legacy TTI, although the scope of embodiments is not limited in this respect.

In a non-limiting example, the legacy TTI may be used in accordance with a legacy LTE protocol (including but not limited to LTE R14) and the short TTI may be used in accordance with another LTE protocol (including but not limited to an enhanced LTE, LTE R15 and/or a later version of LTE).

In another non-limiting example, the legacy TTI may span one millisecond (msec), and the plurality of short TTIs may include four short TTIs. In another non-limiting example, the legacy TTI may span one msec, and the plurality of short TTIs may include two short TTIs. Embodiments are not limited by these example numbers.

In another non-limiting example, a short TTI may span a plurality of symbol periods. At least one of the symbol periods may be based on demodulation reference signals (DMRS). At least one of the symbol periods may be based on data bits.

In some embodiments, multiple legacy TTIs may be allocated for V2V sidelink transmissions. In some cases, one or more of the legacy TTIs may include multiple short TTIs. One or more of those short TTIs may be allocated for V2V sidelink transmissions, in some cases.

At operation 820, the UE 102 may transmit a legacy physical sidelink control channel (PSCCH). In some embodiments, the UE 102 may transmit the legacy PSCCH to indicate, to legacy UEs 102, the V2V sidelink PSSCH transmission by the UE 102. It should be noted that embodiments are not limited to usage of the legacy PSCCH in this operation and/or other operations described herein, as any suitable element may be used. It should be noted that some embodiments may not necessarily include operation 820.

In some embodiments, the UE 102 may transmit the legacy PSCCH in accordance with the legacy TTI, although the scope of embodiments is not limited in this respect. In some embodiments, the UE 102 may transmit the legacy PSCCH in the legacy TTI, although the scope of embodiments is not limited in this respect. In some embodiments, the UE 102 may transmit the legacy PSCCH and PSSCH within the legacy TTI, although the scope of embodiments is not limited in this respect.

At operation 825, the UE 102 may transmit a short PSCCH (sPSCCH). At operation 830, the UE 102 may transmit a short PSSCH (sPSSCH). In some embodiments, the UE 102 may transmit the sPSCCH to indicate, to non-legacy UEs 102, the V2V sidelink transmission by the UE 102. In some embodiments, the V2V sidelink transmission may include transmission of an sPSSCH or PSSCH. Embodiments are not limited to usage of an sPSSCH or PSSCH, however, as other elements may be used in some embodiments. It should be noted that embodiments are not limited to usage of the sPSCCH for operation 825, as other elements (including other types of PSCCH) may be used, in some embodiments. The sPSCCH may be included in a 3GPP standard, in some embodiments. It should be noted that embodiments are not limited to usage of the sPSCCH in this operation and/or other operations described herein, as any suitable element may be used.

In some embodiments, the UE 102 may transmit the sPSCCH in accordance with the selected short TTI, although the scope of embodiments is not limited in this respect. In some embodiments, the UE 102 may transmit the sPSCCH in the selected short TTI, although the scope of embodiments is not limited in this respect. In some embodiments, the UE 102 may transmit the sPSCCH within the selected short TTI, although the scope of embodiments is not limited in this respect.

In some embodiments, multiple sPSCCHs may be transmitted. For instance, multiple short TTIs may be selected, and the UE 102 may transmit multiple sPSCCHs per short TTI.

At operation 830, the UE 102 may transmit a short physical sidelink shared channel (sPSSCH). In some embodiments, the UE 102 may transmit the sPSSCH as part of the V2V sidelink transmission, although the scope of embodiments is not limited in this respect. It should be noted that embodiments are not limited to usage of the sPSSCH for operation 830, as other elements (including other types of PSSCH) may be used, in some embodiments. The sPSSCH may be included in a 3GPP standard, in some embodiments. It should be noted that embodiments are not limited to usage of the sPSSCH in this operation and/or other operations described herein, as any suitable element may be used.

In some embodiments, the UE 102 may transmit the sPSSCH in accordance with the selected short TTI, although the scope of embodiments is not limited in this respect. In some embodiments, the UE 102 may transmit the sPSSCH in the selected short TTI, although the scope of embodiments is not limited in this respect. In some embodiments, the UE 102 may transmit the sPSSCH within the selected short TTI, although the scope of embodiments is not limited in this respect.

In a non-limiting example, the UE 102 may transmit the sPSSCH and the sPSCCH in separate frequency resources in accordance with a frequency division multiplexing (FDM) technique. In another non-limiting example, the UE 102 may transmit the sPSSCH in a short TTI that is later than the selected short TTI in accordance with a time division multiplexing (TDM) technique.

In another non-limiting example, the UE 102 may transmit the PSCCH in first frequency resources allocated for V2V sidelink transmissions by legacy UEs 102. The UE 102 may transmit the sPSCCH in second frequency resources allocated for V2V sidelink transmissions by non-legacy UEs 102.

In another non-limiting example, the sPSCCH may include a sidelink control information (SCI) that indicates first information related to the V2V sidelink transmission by the UE 102. The legacy PSCCH may include a sidelink control information (SCI) format-1 (SCI-F1) that indicates second information related to the V2V sidelink transmission by the UE 102. In some embodiments, the SCI and/or SCI-F1 may indicate resources of the V2V sidelink transmission by the UE 102, such as frequency resources (PRBs, sub-channels and/or other) and/or time resources (subframes, symbols and/or other).

At operation 835, the UE 102 may transmit an automatic gain control (AGC) element. In some embodiments, the UE 102 may transmit the AGC element in a first chronological symbol period of the legacy TTI. In some embodiments, the UE 102 may transmit the AGC element in the first chronological symbol period of the legacy TTI independent of a position of the selected TTI within the legacy TTI. In some embodiments, the UE 102 may transmit the AGC element in a first chronological symbol period of a sub-frame. In some cases, transmission of the AGC element in the first chronological symbol period may enable proper setting of the AGC for legacy UEs 102 to avoid near-far problems and/or dynamic range saturation problems. In addition, transmission of the AGC element in the first chronological symbol period may help to reduce AGC implementation overhead for multiple UEs 102, since the AGC may be settled at the beginning of the legacy TTI.

In some embodiments, the AGC element may be transmitted to enable AGC at legacy UEs 102. In some embodiments, the AGC element may be transmitted to enable AGC at non-legacy UEs 102. In some embodiments, the AGC element may be transmitted to enable AGC at legacy UEs 102 and/or non-legacy UEs 102.

In some embodiments, the AGC element may be based on a predetermined sequence, although the scope of embodiments is not limited in this respect. In some embodiments, the AGC element may be transmitted during a symbol period (such as an AGC symbol period) that may be dedicated-reserved for transmission of the AGC element.

At operation 840, the UE 102 may select a resource pool from candidate resource pools. In some embodiments, the UE 102 may select the resource pool for one or more V2V sidelink transmissions by the UE 102. In some embodiments, sub-frames of different candidate resource pools may be non-overlapping, although the scope of embodiments is not limited in this respect.

In some embodiments, the candidate resource pools may be allocated for V2V transmissions of different latencies per candidate resource pool, although the scope of embodiments is not limited in this respect. In some embodiments, the UE 102 may select the resource pool from the candidate resource pools based at least partly on: a target latency of the V2V sidelink transmission by the UE 102, and the different latencies per candidate resource pool. For instance, the UE 102 may select the resource pool for which a corresponding latency is the same as and/or closest to a target latency of the UE 102. In a non-limiting example, a first resource pool may be allocated for V2V sidelink transmissions of relatively high latency and a second resource pool may be allocated for V2V sidelink transmissions of a relatively low latency. For instance the relatively low latency may be 20 msec or less, although any suitable range for the relatively low latency may be used.

It should be noted that some embodiments may not necessarily include operation 840. For instance, in some embodiments, a single resource pool may be used, in which case the selection of operation 840 may not be necessary.

At operation 845, the UE 102 may monitor a sensing window for V2V sidelink transmissions. In some embodiments, the sensing window may occur before the selected resource pool. In some embodiments, the UE 102 may attempt to detect V2V sidelink transmissions by other UEs 102 during the sensing window. In some embodiments, candidate resource pools may be configured for sensing and/or resource selection windows of different durations.

In some embodiments, the UE 102 may determine one or more signal quality measurements during the sensing window. Non-limiting examples of signal quality measurements include S-RSSI, SNR, RSRP. RSRQ and/or other. In some embodiments, a resource pool may include multiple physical resource blocks (PRBs) and/or sub-channels per sub-frame, and the radio measurement(s) may include a channel busy ratio (CBR). In a non-limiting example, the CBR may be based at least partly on a ratio, for the PRBs/subchannels during a window of sub-frames, of: a total number of PRBs/subchannels for which a signal quality measurement is above a threshold, and a total number of PRBs/subchannels.

At operation 850, the UE 102 may determine one or more available sub-frames. At operation 855, the UE 102 may select one or more sub-frames based on the available sub-frames. At operation 860, the UE 102 may transmit a PSSCH in the selected sub-frames.

In some embodiments, the UE 102 may determine one or more candidate sub-frames of a resource selection window available for the V2V sidelink transmission by the UE 102. In a non-limiting example, one or more SCIs included in the detected V2V sidelink transmissions may be used for the determination of the candidate sub-frames. In another non-limiting example, one or more signal quality measurements (including but not limited to signal quality measurements determined during the sensing window) may be used for the determination of the candidate sub-frames. In some embodiments, the resource selection window may be subsequent to the sensing window. In a non-limiting example, a duration of the resource selection window may be less than or equal to 10 sub-frames or determined by packet transmission latency or configured by UE higher layers. Embodiments are not limited to this example number, as any size may be used for the selection window. It should be noted that the resource selection window may be related to one or more of: selection of resources, re-selection of resources and/or other.

In some embodiments, the UE 102 may select, from the candidate sub-frames, one or more sub-frames for the V2V sidelink transmission by the UE 102 in the resource selection window. The UE 102 may transmit, in the selected sub-frames, a PSSCH based on a block of data bits.

In some embodiments, the UE 102 may select the one or more sub-frames for V2V sidelink transmissions by the UE 102 in multiple selection windows that are shifted in time. In some embodiments, the UE 102 may select the one or more sub-frames for V2V sidelink transmissions by the UE 102 to include the candidate sub-frame that is earliest in the resource selection window. In some cases, this selection technique may be referred to, without limitation, as a "first in time" selection or similar.

It should be noted that some embodiments may not necessarily include all operations shown in FIG. 8. In a non-limiting example, some operations may include one or more of operations 805-835, but may not necessarily include one or more of operations 840-855. In another non-limiting example, some operations may include one or more of operations 840-855, but may not necessarily include one or more of operations 805-835. In another non-limiting example, in embodiments in which the short TTI is not used, the method 800 may not necessarily include one or more of operations 805-835.

In some embodiments, an apparatus of a UE 102 may comprise memory. The memory may be configurable to store information that identifies the selected short TTI. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to selection of the short TTI for the V2V transmission. The apparatus of the UE 102 may include a transceiver to transmit the sPSCCH. The transceiver may transmit and/or receive other blocks, messages and/or other elements.

Figure 9:
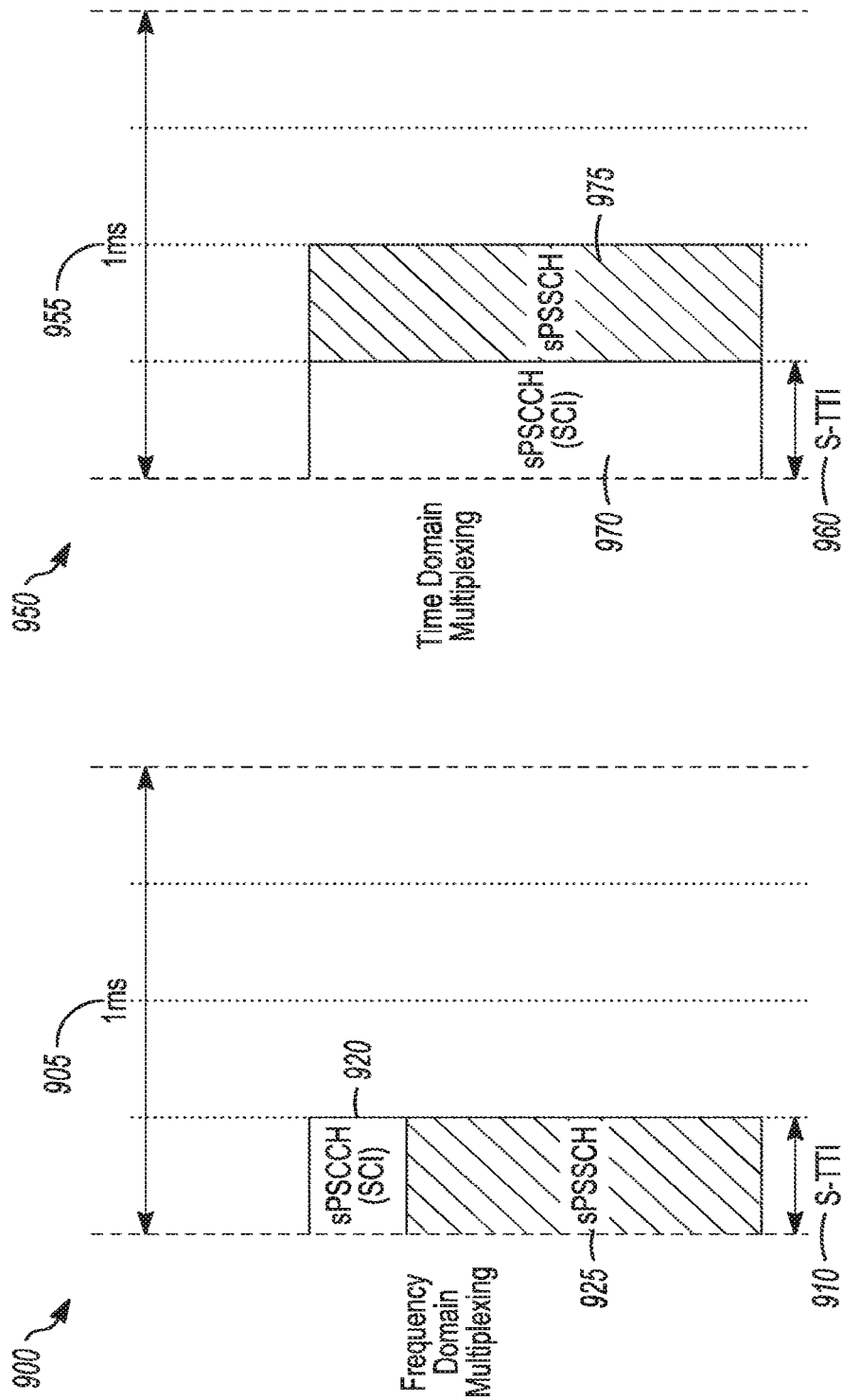
FIG. 9 illustrates example multiplexing arrangements that may be used in accordance with some embodiments.
Figure 10:
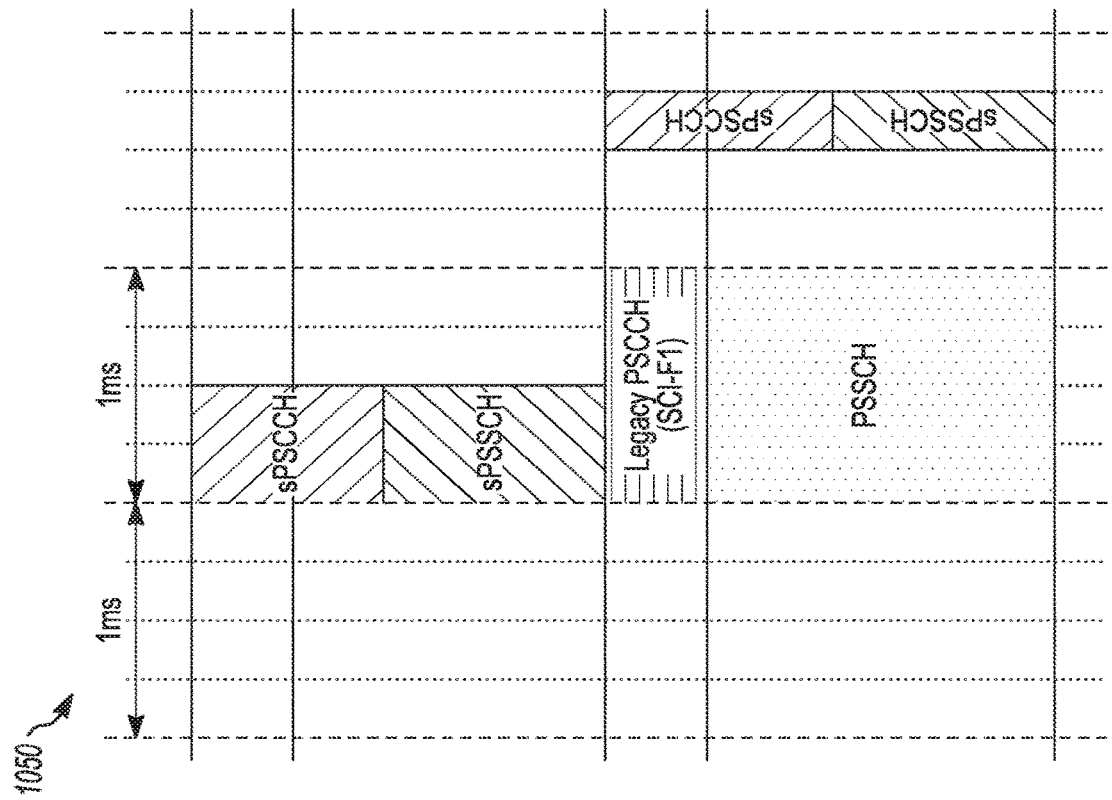
FIG. 10 illustrates example multiplexing arrangements that may be used in accordance with some embodiments.
Figure 10:
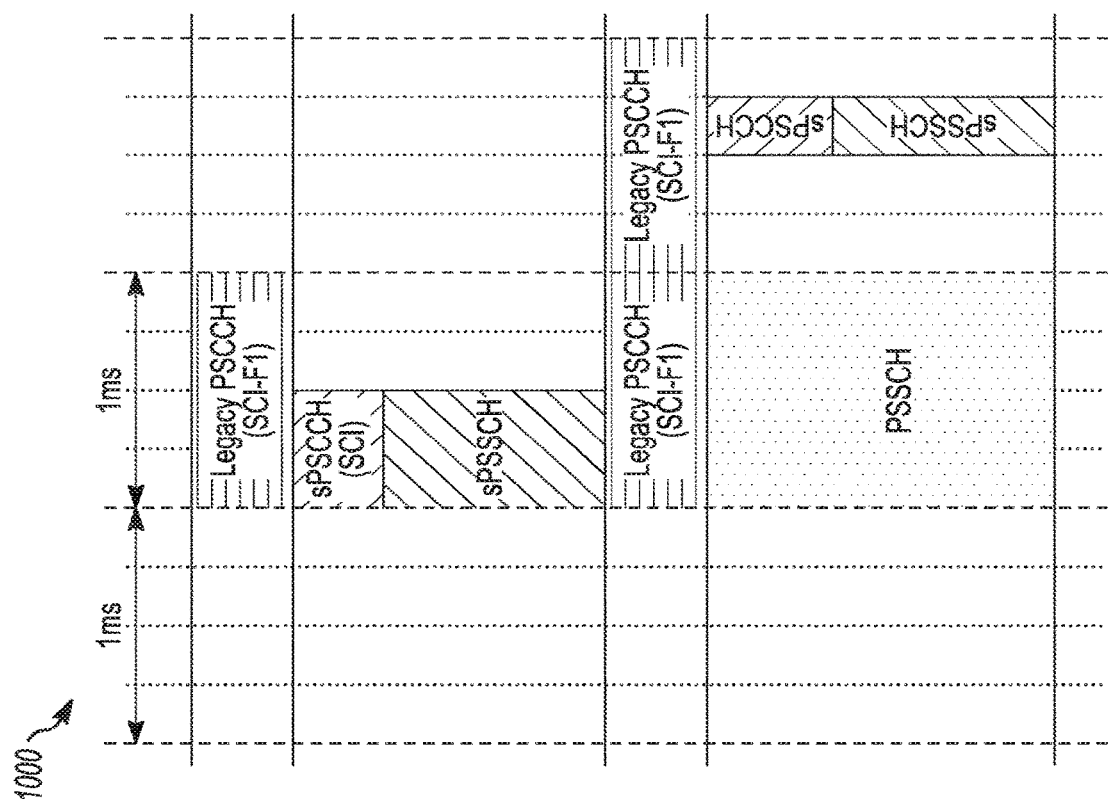
Figure 11:
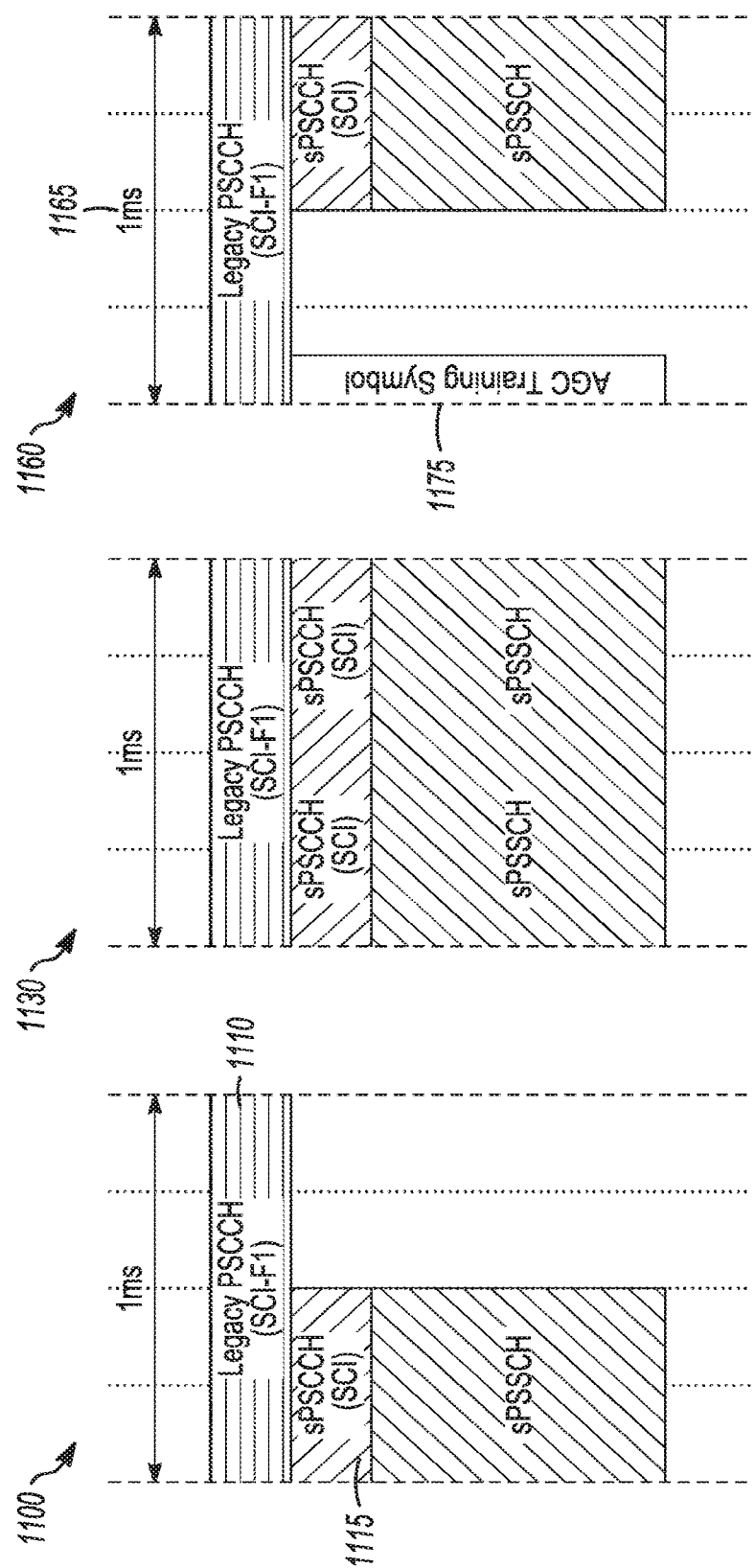
FIG. 11 illustrates example multiplexing arrangements that may be used in accordance with some embodiments.
Figure 17:
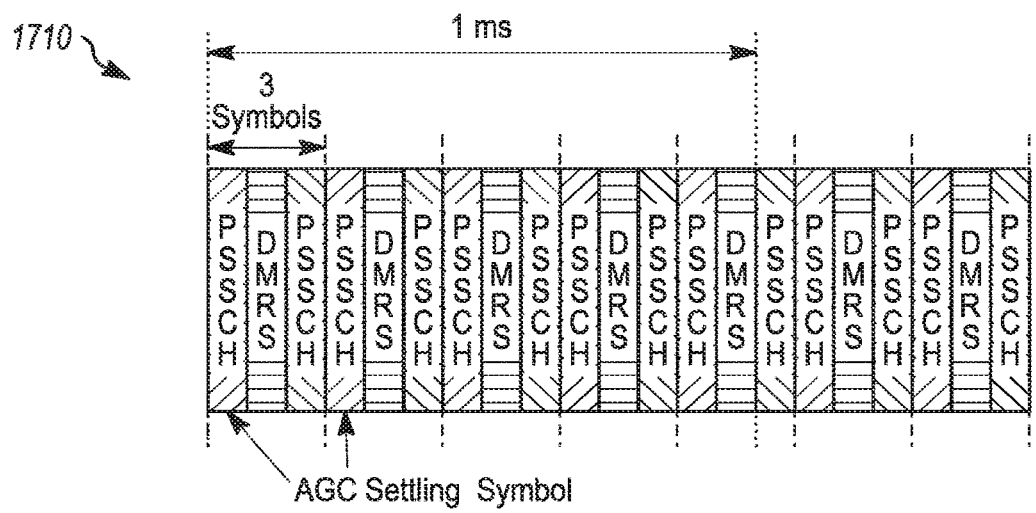
FIG. 17 illustrates example arrangements that may be used in accordance with various TTIs in accordance with some embodiments.
Figure 17:
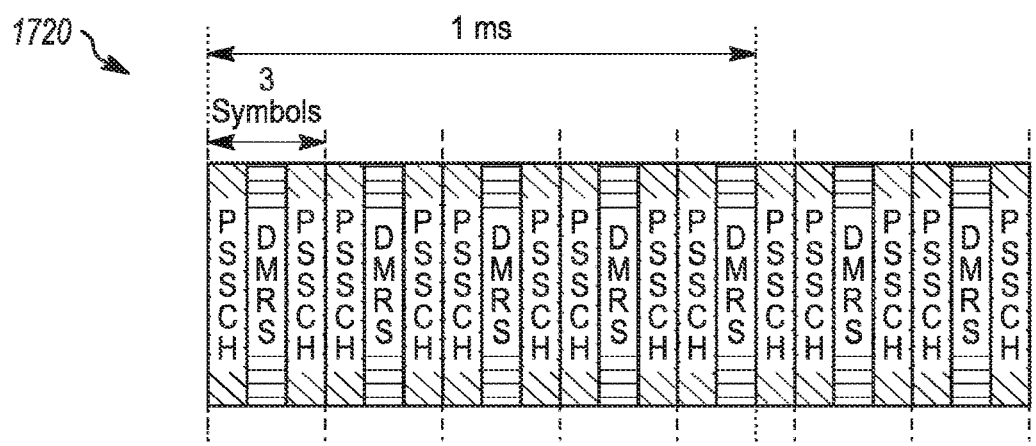
Figure 17:
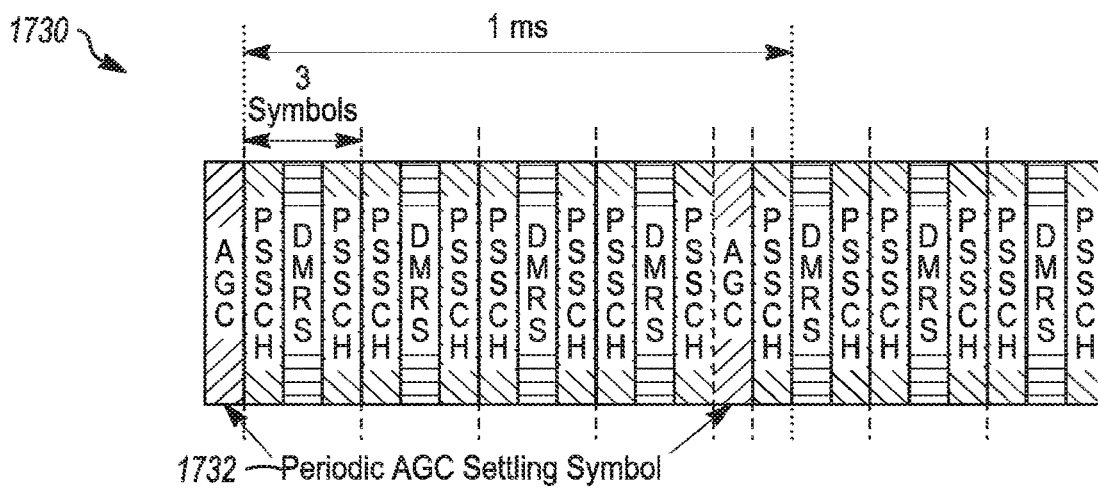
Figure 18A:
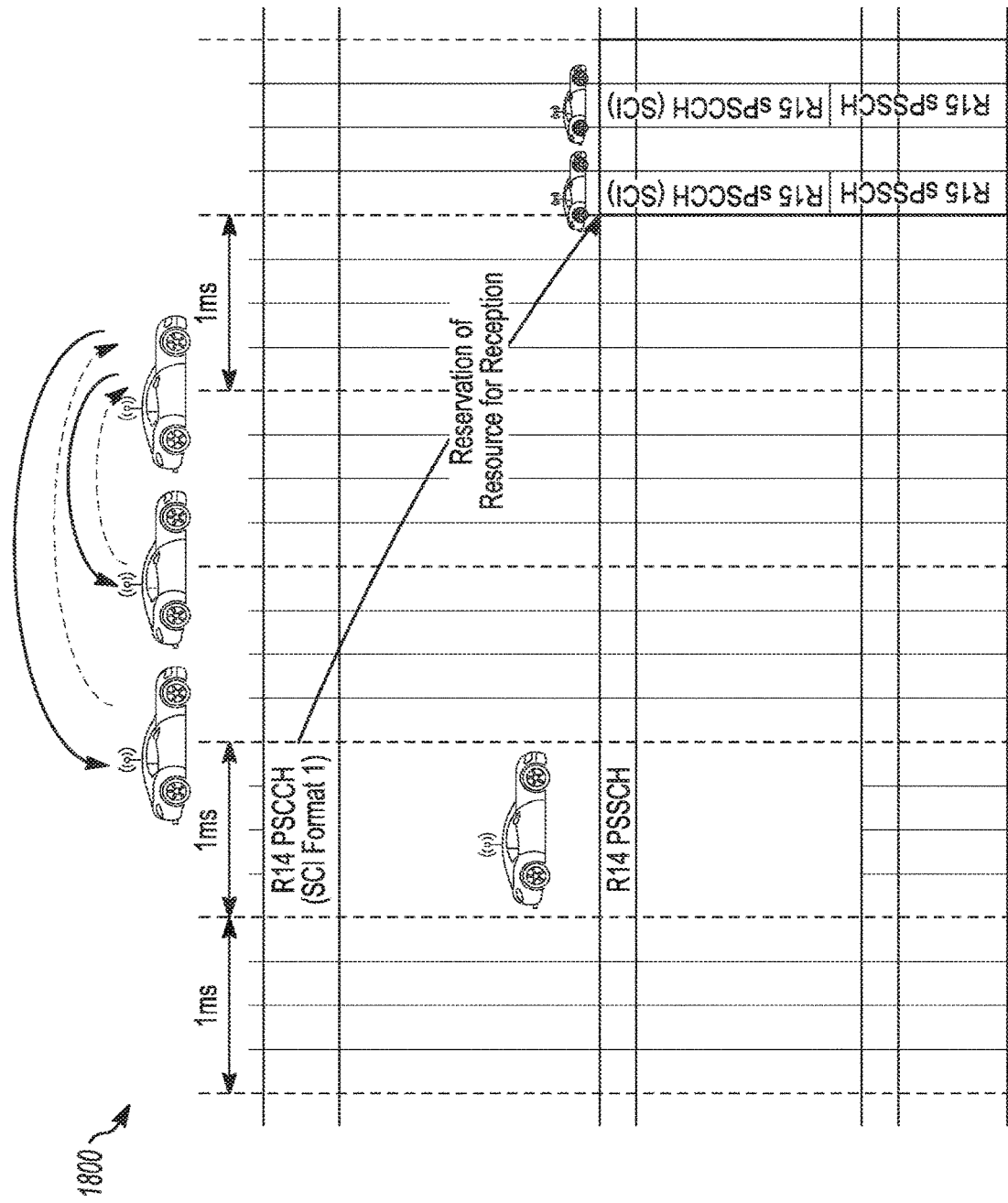
FIGS. 18A-B illustrates example resource assignments that may be used in accordance with some embodiments.
Figure 18B:
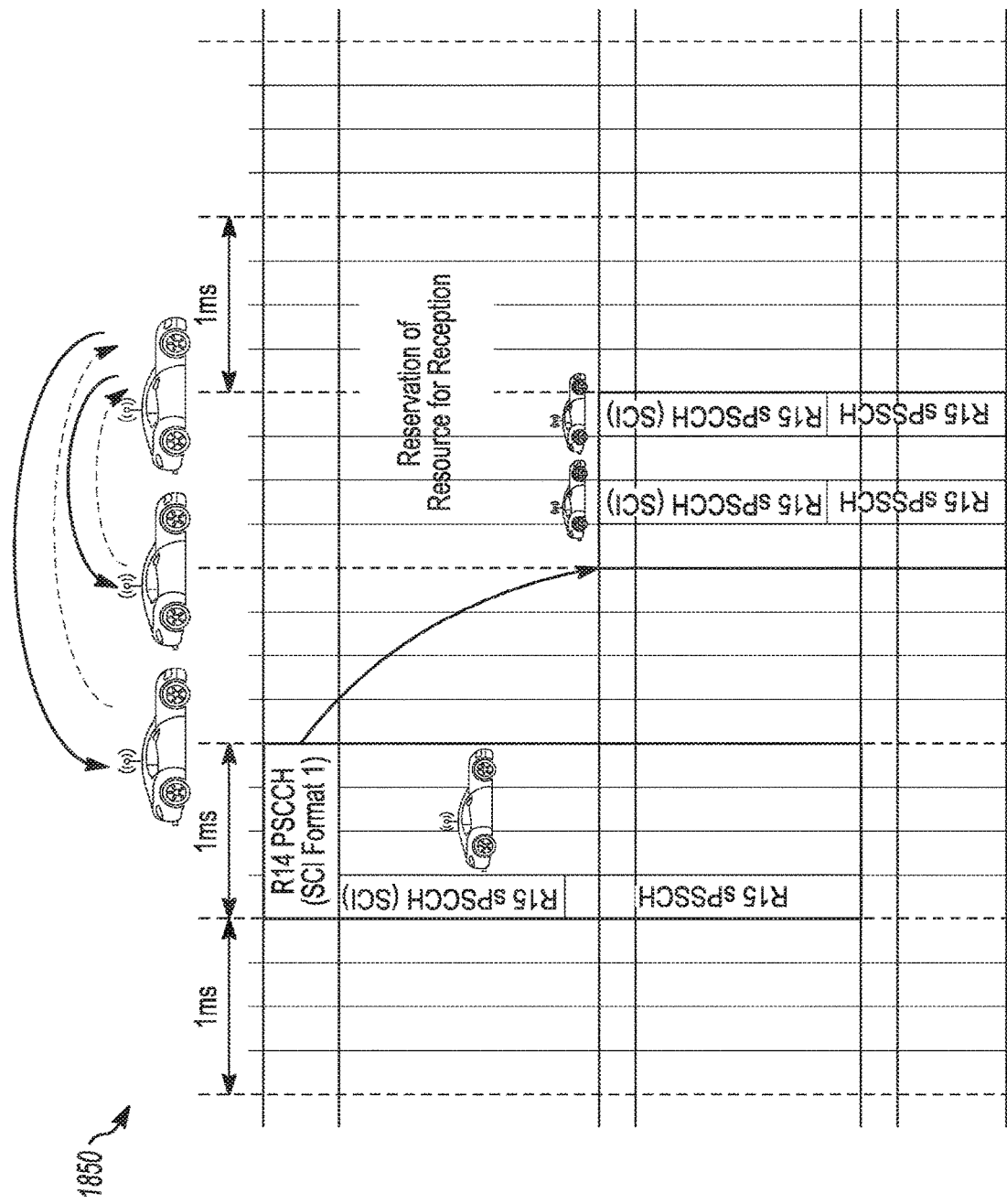
Figure 19:
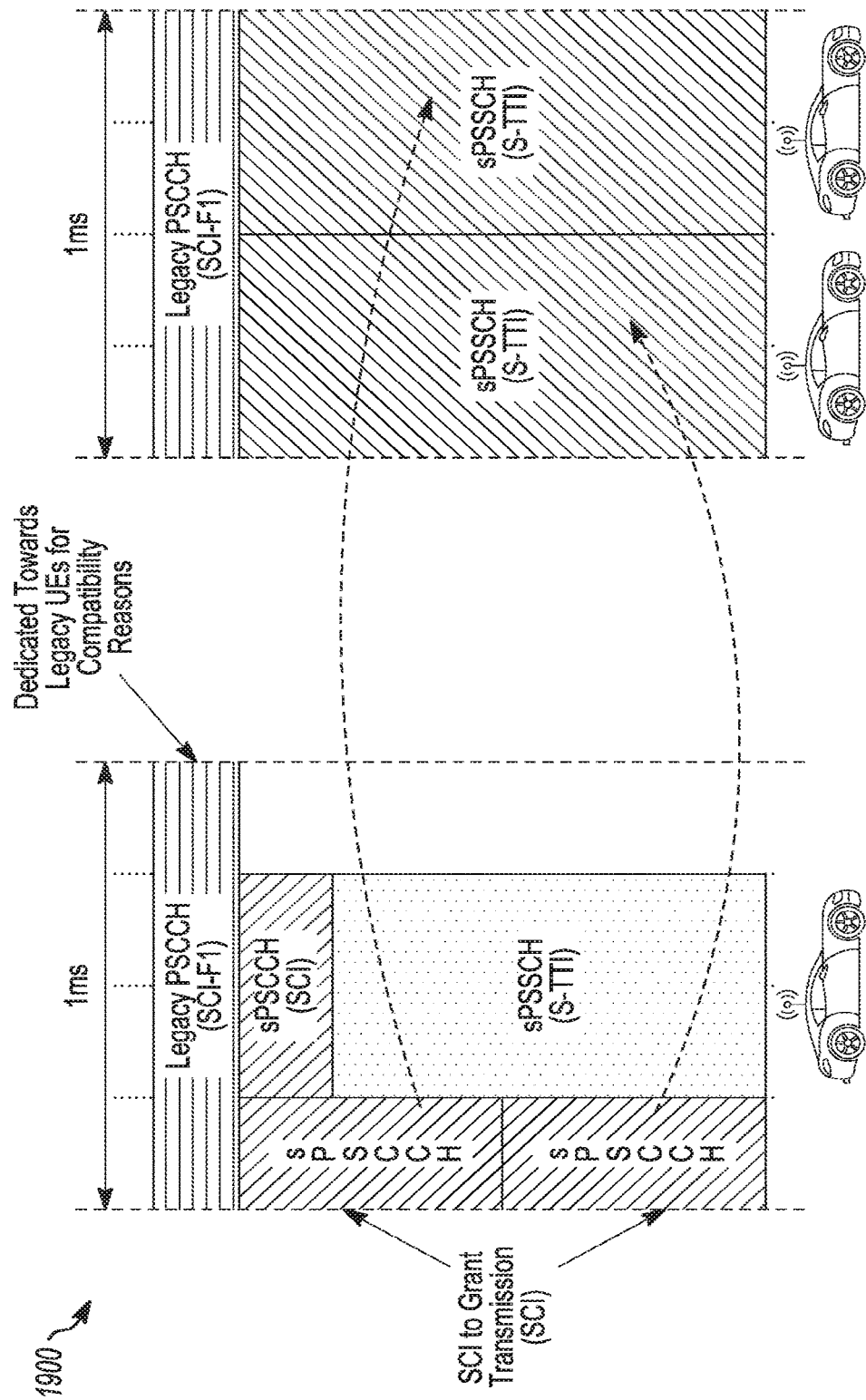
FIG. 19 illustrates example resource assignments that may be used in accordance with some embodiments.

FIGS. 9-11 illustrate example multiplexing arrangements that may be used in accordance with some embodiments. FIGS. 12-17 illustrate example arrangements that may be used in accordance with various transmission time intervals (TTIs) in accordance with some embodiments. FIGS. 18-19 illustrate example resource assignments that may be used in accordance with some embodiments. FIGS. 20-23 illustrate example techniques for resource selection in accordance with some embodiments.

It should be noted that the examples shown in FIGS. 9-23 may illustrate some or all of the concepts and techniques described herein in some cases, but embodiments are not limited by the examples. For instance, embodiments are not limited by the name, number, type, size, ordering, arrangement and/or other aspects of the operations, messages, time intervals, symbols, eNBs 104, gNBs 105, UEs 102, and other elements as shown in FIGS. 9-23. Although some of the elements shown in the examples of FIGS. 9-23 may be included in a 3GPP LTE standard, 5G standard, NR standard and/or other standard, embodiments are not limited to usage of such elements that are included in standards.

In some embodiments, sidelink communication in accordance with a transmission time interval (TTI) may be used. In a non-limiting example, a 3GPP LTE protocol (including but not limited to LTE Release 14) may use sidelink communication in accordance with a TTI of one millisecond (msec). In some embodiments, periodic broadcast vehicle-to-vehicle (V2V) communication may be used. In a non-limiting example, a periodicity of 100 msec may be used.

In some embodiments, vehicle-to-everything (V2X) communication may be used in accordance with unicast communication, group-cast communication, communication within vehicle platoon and/or other communication. In some cases, communication may be performed in accordance with a latency in a range of 10 to 20 msec, although the scope of embodiments is not limited in this respect.

In some embodiments, LTE sidelink communication with a short transmission time interval (S-TTI) of less than one msec may be used. This TTI may be referred to herein as a "short TTI," but such references are not limiting. Such references may be used for clarity, in some cases. In some scenarios, usage of the short TTI transmission may enable support of V2X use cases based at least partly on LTE V2V design and specification.

In some embodiments, short TTI support in LTE may include several design options, some of which are described herein. In some scenarios, coexistence of short TTI communication with LTE R14 resource pools and design may be realized. In some embodiments, short TTI operation on a dedicated carrier may be used, wherein a short TTI physical structure may be used. In some cases, for short TTI coexistence with R14 LTE-V2V communication in which same and/or overlapping resource pools are used, various techniques may be used to address potential near-far scenarios.

In some embodiments, enhanced communication using the short TTI (S-TTI) may coexist with legacy LTE V2V communication (with legacy TTI (L-TTI)) of 1 msec duration) using the same resource pools as defined in LTE R14.

Several scenarios of S-TTI usage with respect to L-TTI operation are possible, including but not limited to the scenarios described below. These scenarios may be referred to herein as "Scenario 1,", "Scenario 2,", "Scenario 3," and "Scenario 4" for clarity, but such references are not limiting.

In Scenario 1, S-TTI and L-TTI coexistence in a legacy resource pool (LTE R14) may be used, with legacy sidelink control channel (PSCCH, SCI-F1) transmission. In this scenario. S-TTI and L-TTI transmissions may share the same resource pool. The enhanced UE 102 (such as R15+) may utilize S-TTI for communication with other enhanced UEs 102 and may transmit legacy PSCCH, SCI-Format 1, so that it may be received/decoded by legacy UEs 102 (such as R14) and used for sensing and resource selection.

In Scenario 2, S-TTI and L-TTI coexistence in a legacy resource pool may be used, without PSCCH SCI-Format 1 transmission. In this scenario, S-TTI and L-TTI transmissions may share the same resource pool. The enhanced UE 102 may utilize S-TTI for communication with other enhanced UEs 102, but may not necessarily transmit legacy SCI-F1. In this case, legacy UEs 102 may not be aware of potential S-TTI transmissions, and thus may not be able to take into account these S-TTI transmissions following legacy sensing and resource selection (e.g. resource exclusion step). It still may be possible to use energy sensing (S-RSSI measurements) and/or resource ranking (including but not limited to techniques of an LTE R14 protocol) to avoid collision with S-TTI transmission. However, it still may not be possible to differentiate priority signaled in SCI-Format1, in some cases.

In Scenario 3, S-TTI and L-TTI transmissions may use different resource pools, with SCI-F1 transmission enabled. In this scenario, there may not necessarily be coexistence/compatibility issues when legacy (R14) and enhanced UEs 102 do not share a resource pool, since different pools are used for S-TTI and L-Tri transmissions. From a coexistence point of view, transmission of SCI-Format 1 by enhanced UEs 102 may not necessarily be used. However, the SCI-Format 1 transmission could be used by enhanced UEs 102 for entire subframe reservation at least in terms of time resources, in some cases.

In Scenario 4, S-TTI and L-Tri transmissions may use different resource pools, without SCI-F1 transmission. In this scenario, there may not necessarily be coexistence/compatibility issues. The enhanced UEs 102 may benefit from the reduced latency. Half-duplex and in-band emission effects may reduce, however a link budget as well, when the S-TTI is utilized.

In some cases, Scenarios 3 and 4 may be considered as scenarios with enhanced UEs 102 in a green field deployment without compatibility considerations. The Scenario 4 may be considered, in some cases, as promising in terms of improved performance. Scenario 1 and Scenario 2 may have multiple technical challenges, including but not limited to challenges related to control channel design. AGC settling interval design, S-TTI physical structure for PSCCH (sPSCCH) and PSSCH (sPSSCH). One or more of the techniques described herein may address those issues, in some cases.

Some techniques described herein may be related to short TTI control channel design, although the scope of embodiments is not limited in this respect.

In some embodiments, dedicated control signaling and channels for S-TTI may be defined (for instance, the sPSCCH) in addition to sPSSCH sidelink shared channel. In some embodiments, the sPSCCH and sPSSCH may follow similar resource configuration principles as defined for legacy UEs 102 and may have similar S-TTI physical structures, although the scope of embodiments is not limited in this respect. The amount of sPSCCH and sPSSCH sub-channels may be reduced in comparison to legacy systems, in some cases. For instance, wideband transmissions may be more typical in case of S-TTI operation, in some cases.

Referring to FIG. 9, in the example scenario 900, the sPSCCH transmission 920 may be multiplexed with the sPSSCH transmission 925 in the frequency domain, during the S-TTI 910. Referring to FIG. 9, in the example scenario 950, the sPSCCH transmission 970 may be multiplexed with the sPSSCH transmission 975 in the time domain. In some cases, the dedicated S-TTI 960 may be allocated for multiple sPSCCH transmissions.

In some cases, support of S-TTI in the same resource pool as used by legacy transmissions may have significant impact on sensing and resource selection procedures (including but not limited to the procedures of legacy LTE and/or LTE R14). Such impacts may be different depending on whether SCI-Format 1 is transmitted or not by enhanced UEs 102 in some cases (including but not limited to Scenario 1 and Scenario 2).

In some embodiments. SCI-Format 1 may be transmitted by enhanced UEs 102. In Scenario 1, an enhanced UE 102 may transmit SCI-F1 using L-TTI (for instance, according to the legacy PSCCH physical structure and SCI design). In some cases, sPSSCH data may be transmitted in S-TTI allocations. In some cases, additional SCI control signaling may be transmitted inside of S-TTI PSCCH allocation (sPSCCH).

The scenario 1000 in FIG. 10 illustrates a non-limiting example of multiplexing of legacy and enhanced PSCCH/PSSCH. The scenario 1000 may be applicable to Scenario 1, although the scope of embodiments is not limited in this respect.

In some embodiments, in case of successful SCI-Format 1 reception, the legacy UE 102 may potentially detect the presence of transmission by an enhanced UE 102 and may thus take this information into account for resource selection. In some cases, one or more of PSSCH-RSRP measurement and S-RSSI measurement may be impacted as part of R14 sensing and resource selection procedure. For the PSSCH-RSRP measurement, if the enhanced UE 102 does not transmit all four DMRSs per subframe, the PSSCH-RSRP measurements may be affected (such as biased and/or other). This measurement may not be available for S-TTI transmissions, in some cases. However, if at least one DMRS is transmitted in S-TTI according to the R14 format, the resource exclusion step of resource selection procedure may be applied. In some cases, the PSSCH-RSRP measurement may be degraded. For the S-RSSI measurement, if the enhanced UE 102 transmits in the S-TTI portion of the subframe, the S-RSSI measurement may be affected (such as biased and/or other).

In some embodiments, if sensing-based S-TTI resource selection is used, the following technique may be used for enhanced UEs 102 and/or R15 UEs 102. In a non-limiting example, sPSSCH-RSRP and/or S-RSSI measurements per S-TTI allocation may be used. In some cases, S-TTI resource allocation may be selected, based at least partly on such measurement(s), for transmission.

In some embodiments, SCI-F1 may not necessarily be transmitted by enhanced UEs 102. The scenario 1050 in FIG. 10 illustrates a non-limiting example of multiplexing of legacy and enhanced PSCCH/PSSCH. The scenario 1050 may be applicable to Scenario 2, although the scope of embodiments is not limited in this respect.

In Scenario 2, the legacy SCI-F1 is not transmitted by enhanced UE 102. The sPSSCH data may be transmitted in S-TTI allocations, while the additional SCI control signaling may be also carried inside of S-TTI allocation, in some cases. In some cases, legacy sensing and resource selection procedure may be affected more significantly. One or more of the following may be impacted for legacy sensing and resource selection: priority support, PSSCH-RSRP measurement, S-RSSI measurement and/or other. For the priority support, information about short-TTI transmission priority may not be available to legacy UEs 102 and thus transmission priority of enhanced UEs 102 may not necessarily be respected by legacy sensing and resource selection procedures. On the other hand, enhanced UEs 102 may respect priority of legacy transmission and therefore there may not be issues from the legacy performance perspective.

For the PSSCH-RSRP measurement, this measurement may not be available for S-TTI transmissions. Therefore the resource exclusion step of resource selection procedure may not necessarily be properly applied, in some cases.

For the S-RSSI measurement, this measurement may be affected (such as biased and/or other) similar to the Scenario 1. The ranking and resource selection procedure may help to exclude high energy resources occupied by S-TTI transmissions, in some cases.

In some embodiments, transmission of SCI-F1 jointly with short TTI may reduce the latency benefits that can be provided by short TTI in cases in which enhanced UEs 102 decode SCI-F1 in order to decode sPSSCH. However, the system may be designed in a way that SCI-F1 is transmitted mainly for compatibility considerations to legacy UEs 102, while for enhanced UEs 102, the additional sPSCCH can be defined. In cases in which S-TTI control and shared channel are introduced, the latency benefit of S-TTI transmission may be preserved for V2V communication, in some cases. The scenario 1100 in FIG. 11 illustrates a non-limiting example of multiplexing of legacy and enhanced PSCCH/PSSCH. The scenario 1100 may be related to compatibility and/or latency reduction considerations, although the scope of embodiments is not limited in this respect. The legacy PSCCH (indicated by 310) may be directed toward legacy UEs 102 for compatibility reasons, in some cases. The sPSCCH (indicated by 315) may be directed toward enhanced UEs 102 for latency reduction, in some cases.

In some cases, AGC dynamic range, implementation overhead and/or other issues may be considered. In a non-limiting example, a near-far problem may be related to AGC dynamic range. The multiplexing of S-TTI and L-TTI transmissions in the same subframe can have significant impact on legacy UE 102 demodulation performance. For instance, when legacy UEs 102 receive data from the distant legacy transmitters and nearby enhanced UEs 102 trigger S-TTI transmission starting in the middle of a subframe, a significant near far issue may happen for legacy UE 102 reception. The legacy UE 102 may not be expected to adjust AGC at every symbol or according to S-TTI granularity in time. This issue may lead to significant non-linear distortions and may potentially affect reception of legacy UEs 102 and/or R14 UEs 102.

In some embodiments, the enhanced UE 102 may use one or more of the following transmission options. Such options may mitigate dynamic range issues for legacy UEs 102, in some cases. In a first option, the enhanced UE 102 may use multiple S-TTIs within subframe. This may reduce the latency and/or increase reliability, in some cases. Multiple enhanced UEs 102 may be multiplexed in the frequency domain, in some cases. In this case, the legacy UE 102 may use a first symbol in the sub-frame to settle its AGC parameters according to legacy behavior. The scenario 1130 in FIG. 11 illustrates a non-limiting example of the first option.

In a second option, the enhanced UE 102 may transmit a signal in the first symbol of a sub-frame. In some cases, this may enable legacy UEs 102 to settle their AGC according to a maximum expected level of received power range within a subframe. The scenario 1160 in FIG. 11 illustrates a non-limiting example of the first option. The AGC training symbol (indicated by 1175) is transmitted during the first symbol of the sub-frame 1165.

In some embodiments, a dedicated region within each S-TTI may be defined. In some cases, this may enable enhanced UEs 102 to precisely settle AGC before each S-TTI reception.

In some embodiments, legacy UEs 102 and/or R14 UEs 102 may assume one symbol for AGC settling time. If the same assumption is kept in case of S-TTI, then depending on the number of S-TTIs within subframe, the AGC implementation overhead may grow substantially. For legacy UE 102, AGC implementation overhead may be one symbol per subframe. For enhanced UEs 102, the AGC implementation overhead may increase to the amount of S-TTIs per subframe. One or more of the following techniques may be used to reduce the AGC overhead. In a first technique, a faster AGC convergence may be used. An AGC convergence time within a CP duration may be desirable, for instance, for Enhanced UEs 102. In a second technique, the first symbol of the sub-frame may be used for AGC training. UEs 102 that are planning to occupy the S-TTI portion of the sub-frame may transmit additional signal for AGC settling at the beginning of each subframe (for instance, the first symbol of the subframe may be an AGC training symbol) independently from S-TTI allocation within the sub-frame. This approach may enable AGC operation at the subframe rate, may reduce the AGC implementation overhead and/or may result in AGC behavior consistent with legacy UE 102 behavior.

In some embodiments, one or more of the following signals may be used for AGC training. In a non-limiting example, a dedicated preamble or reference signal may be used. Some or all UEs 102 may transmit the same signal. The signal may be predefined in a specification and/or configured by network/eNBs 104, in some cases. In another non-limiting example, demodulation reference signals (DM-RSs) may be used. Each UE 102 may randomly select a particular sequence from a predefined set of DM-RS sequences. In another non-limiting example, sPSSCH/sPSCCH data may be used. Resources used for AGC settling may be used for data transmission. In that case, the data symbol may be used as an AGC training sequence. In some embodiments, the sequence may or may not be punctured at the receiver depending on convergence time. In another non-limiting example, a copy of the data symbol from sPSSCH/sPSCCH may be used. In this case, symbols used for AGC settling may or may not be combined for data reception, depending on AGC convergence time for a given subframe. The copy of the data symbol from S-TTI allocation may be used as an AGC training symbol.

Various options for the short TTI are presented below. Embodiments are not limited to these options. The options include slot and sub-slot level S-TTI physical structures of different sizes for sPSCCH and sPSSCH channels.

A set of basic S-TTI patterns may assume a fixed number of symbols for each S-TTI pattern. The S-TTI patterns may be constructed from demodulation reference signals (DM-RS) and data symbols, which may carry information of any defined sidelink channel (including but not limited to a control channel (PSCCH), shared channel (PSSCH), broadcast channel (PSBCH), discovery channel (PSDCH) and/or other).

Figure 12:
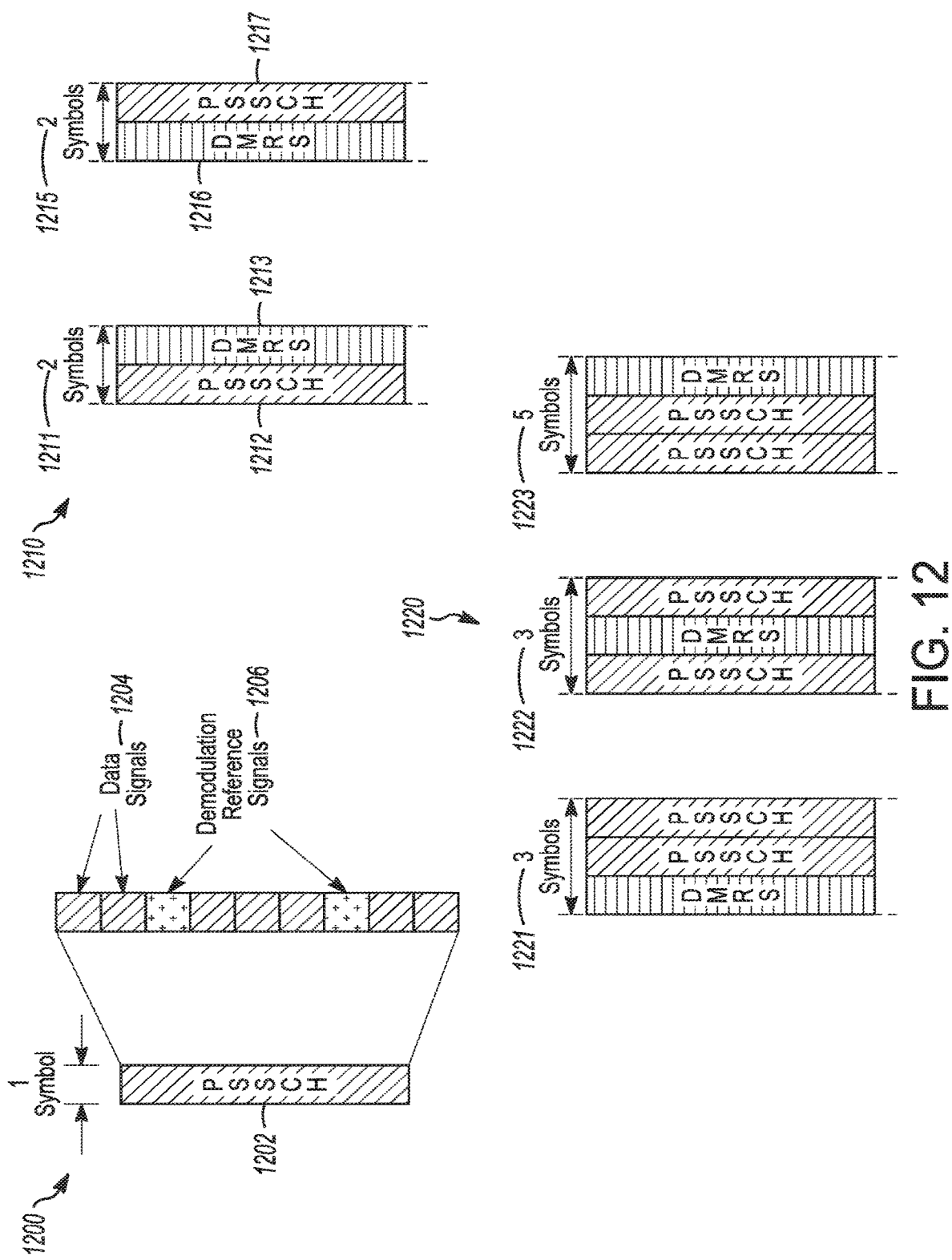
FIG. 12 illustrates example arrangements that may be used in accordance with various transmission time intervals (TTIs) in accordance with some embodiments.
Figure 13:
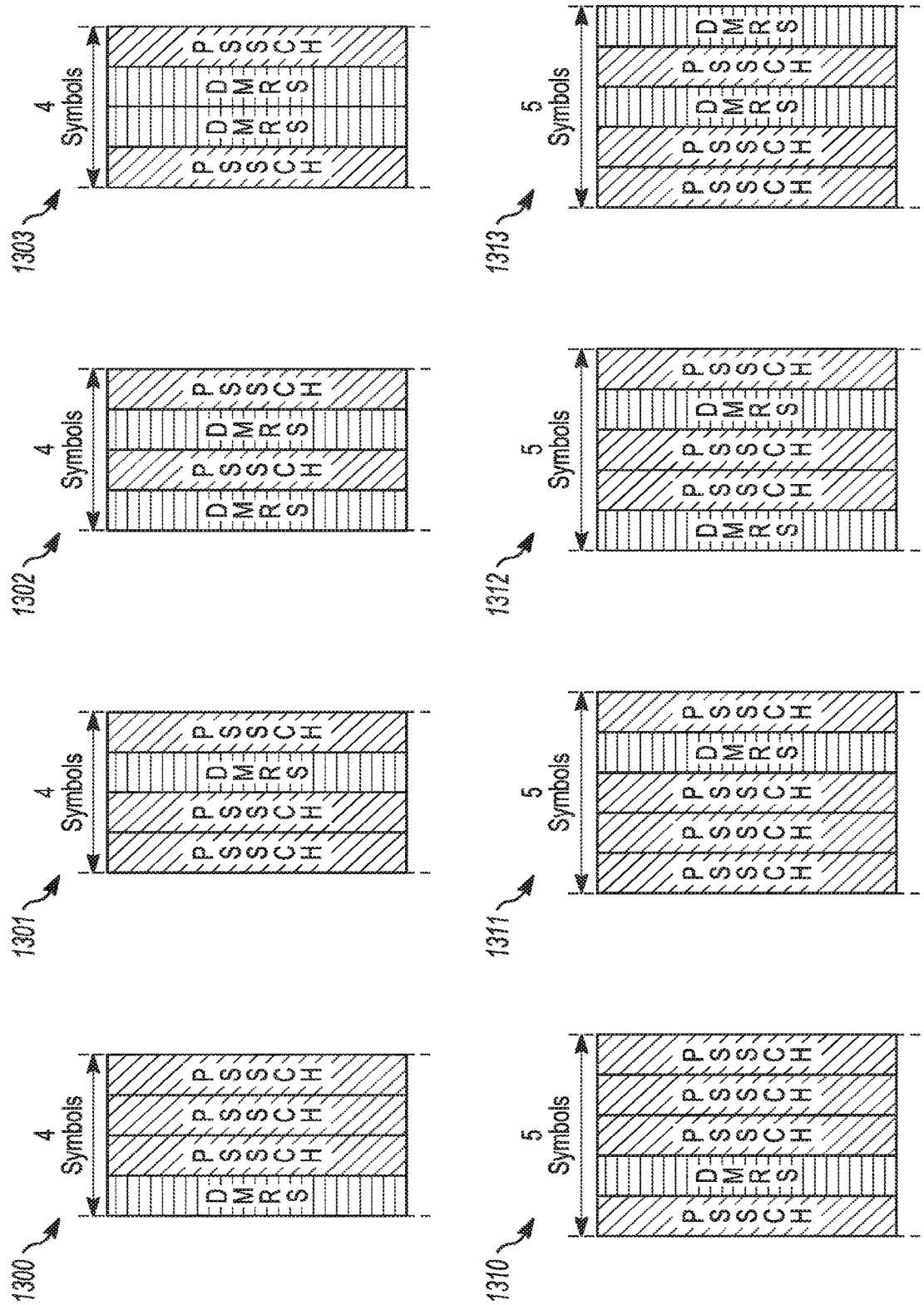
FIG. 13 illustrates example arrangements that may be used in accordance with various TTIs in accordance with some embodiments.

Non-limiting examples of S-TTI patterns are shown in FIGS. 12 and 13. Embodiments are not limited to the number of DMRS symbols, the number of PSSCH symbols, the arrangements of DMRS symbols and PSSCH symbols, the ordering of DMRS symbols and PSSCH symbols or to other aspects of the examples. The examples shown in FIGS. 12 and 13 are not exhaustive. Additional patterns similar to those shown may be used, in some embodiments. In some embodiments, one or multiple data symbols from any basic pattern may be punctured. In some embodiments, one or multiple data symbols from any basic pattern may be used for transmission of other signals (including but not limited to AGC training signal, ranging/positioning reference signals and/or other). In some embodiments, symmetric S-TTI patterns may be considered as candidates for LTE S-TTI sidelink physical structures. In a non-limiting example, such structures may include ranges of symbols from 1 to 7. S-TTI structures for larger number of symbols may be based on aggregation of S-TTI patterns, including but not limited to the example patterns shown in FIGS. 12 and 13.

It should be noted that in the examples shown and in other embodiments, one or more data symbols may also include resource elements (REs) occupied by demodulation reference signals (DM-RS RE). For instance, as shown in 1200, the PSSCH 1202 may include DMRS 1206 and data signals 1204. This arrangement may be extended to the symbols in other examples of FIGS. 12 and 13, although the scope of embodiments is not limited in this respect. The example 1200 may be a basic S-TTI pattern of size equal to one. Basic S-TTI patterns for the lengths from 2 to 7. The basic set of S-TTI patterns could further be extended using concatenation/combination of one or multiple basic S-TTI patterns.

In the example 1210 in FIG. 12, two patterns 1211 and 1215 are shown. The pattern 1211 includes a PSSCH 1212 followed by DMRS 1213. The pattern 1215 includes DMRS 1216 followed by the PSSCH 1217. Also in FIG. 12, three example patterns 1221, 1222, and 1223 are shown. Each of those patterns includes three symbols (one DMRS symbol and two PSSCH symbols). Various orderings of the DMRS symbol and PSCCH symbols are shown.

In FIG. 13, four example patterns 1300, 1301, 1302, and 1303 are shown. Each of those patterns includes four symbols. Patterns 1300 and 1301 include one DMRS symbol and three PSSCH symbols. Patterns 1302 and 1303 include two DMRS symbols and two PSSCH symbols. In FIG. 13, four example patterns 1310, 1311, 1312, and 1313 are shown. Each of those patterns includes five symbols. Patterns 1310 and 1311 include one DMRS symbol and four PSSCH symbols. Patterns 1312 and 1313 include two DMRS symbols and three PSSCH symbols. Patterns that include three or more DMRS symbols are also possible.

In some embodiments, patterns of more than five symbols are possible. Various numbers of DMRS symbols and PSSCH symbols may be used. Various ordering/arrangements of the DMRS and PSSCH symbols may be used.

Figure 14:
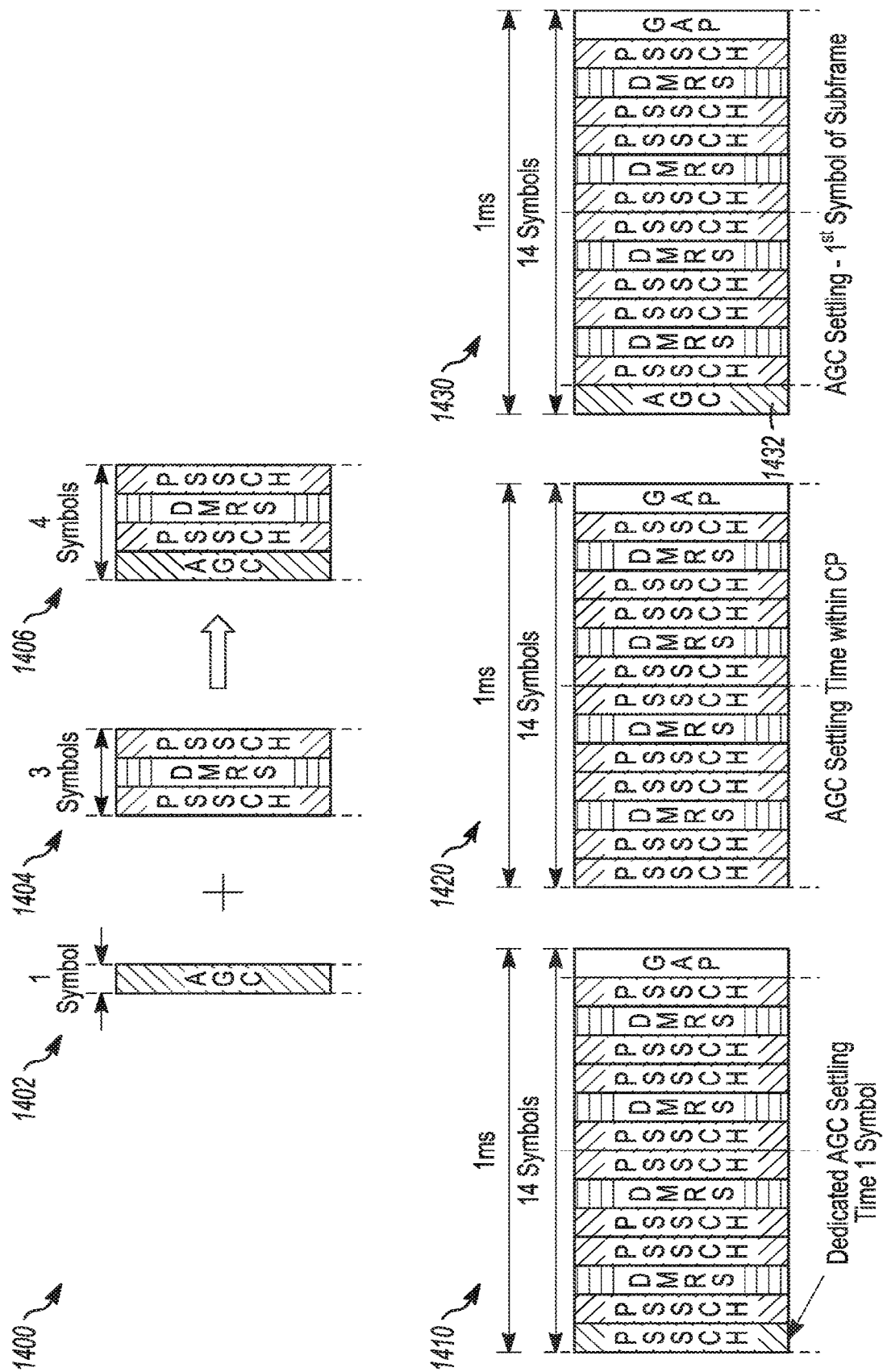
FIG. 14 illustrates example arrangements that may be used in accordance with various TTIs in accordance with some embodiments.

In some embodiments, an S-TTI structure of size m may include k AGC settling symbols. It may be constructed using basic S-TTI structure of size m-k. For example, an S-TTI of size four with one AGC settling symbol may be constructed using basic S-TTI pattern of size three and one AGC symbol appended to the beginning of the basic S-TTI pattern. An example of such is shown in FIG. 14, in which the unit 1406 is based on the AGC symbol 1402 prepended to the unit 1404. Embodiments are not limited to the number, arrangement or other aspects of the DMRS and PSSCH shown in FIG. 14. For instance, units of size other than three (as in 1404) may be used.

In some embodiments, an S-TTI pattern with reserved/excluded symbols construction may be used. In a non-limiting example, an S-TTI pattern of size m with k excluded/reserved symbols may be constructed from L basic S-TTI patterns in accordance with a relationship in which a summation of k and pattern sizes of the L basic S-TTI patterns is equal to m. For instance, the relationship below or a similar relationship may be used.

$$k + \sum_{i=1}^{L} \text{pattern\_size}_i = m$$

In some embodiments, an LTE frame structure with a sidelink S-TTI may be used. Based on a set of S-TTI structures and procedures of S-TTI patterns construction, the LTE sidelink frame structure of the following two types may be constructed. In a non-limiting example, the subframe structure may be aligned with legacy (including but not limited to LTE R14) sidelink subframe structure. The S-TTI design, which results in subframe structure, may be aligned with the legacy subframe. This may be used to realize benefits of legacy SCI-F1 usage, in some cases. In this case, legacy UEs 102 may perform AGC settling and PSSCH-RSRP measurements using legacy procedures.

In another non-limiting example, a different frame structure with a specific subframe structure may be used. In some embodiments, a subframe structure may differ from a legacy (such as LTE R14 and/or other) subframe structure. While the S-TTI structure may be optimized for enhanced UE 102 reception and/or R15 UE 102 reception, the legacy UE 102 performance may be degraded due to improper PSSCH-RSRP and S-RSSI measurements, in some cases.

In some embodiments, an S-TTI sub-frame structure may be aligned with legacy (such as LTE R14 and/or other) PSSCH/PSCCH sub-frame structure. In some embodiments, legacy DMRS structure may include four DMRSs per subframe. Assuming that DMRS position and waveform are not changed (to reduce impact on legacy sensing and resource selection procedure), the S-TTI configuration options may be limited, in some cases. In some embodiments, the S-TTI may have either one or two DMRS symbols, resulting in slot based S-TTI and sub-slot based S-TTI physical structures.

In some embodiments, in legacy operation, a last symbol (such as a final symbol) of a sidelink subframe may be punctured. In some embodiments, for S-TTI based operation, the puncturing described above may not necessarily be used. In addition, in some cases of S-TTI, the last symbol of the subframe may be used for S-TTI transmission. It may be assumed, in some cases, that there is enough time to perform AGC and TX/RX turnaround within one symbol. Otherwise, the reception of subsequent S-TTI may be skipped.

In some embodiments, slot and sub-slot based S-TTI structures may be used. In cases of slot level TTI, two DMRSs may be present per S-TTI which spans one slot. In cases of sub-slot level TTI, one DMRS may be used per S-TTI. The amount of symbols per S-TTI may depend on one or more assumptions of AGC operation for enhanced UEs 102 and/or R15 UEs 102. In a non-limiting example, one symbol for AGC settling within the S-TTI may be used.

In another non-limiting example, a dedicated AGC symbol may be used at the first symbol of the subframe. This may be considered a "fast AGC" in some cases, although the scope of embodiments is not limited in this respect.

Non-limiting example sub-frame constructions are shown in FIGS. 14-17. The examples are not exhaustive. In some embodiments, a structure may be based on one or more of the structures shown in FIGS. 14-17. In some embodiments, a structure may be similar to one or more of the structures shown in FIGS. 14-17. Embodiments are not limited to the number, type, arrangement and/or other aspects of the symbols shown.

In some embodiments, a GAP symbol may be either occupied by S-TTI with increased number of symbols or allocated for one symbol S-TTI that may be used for transmission of fast responses or acknowledgements.

Figure 15:
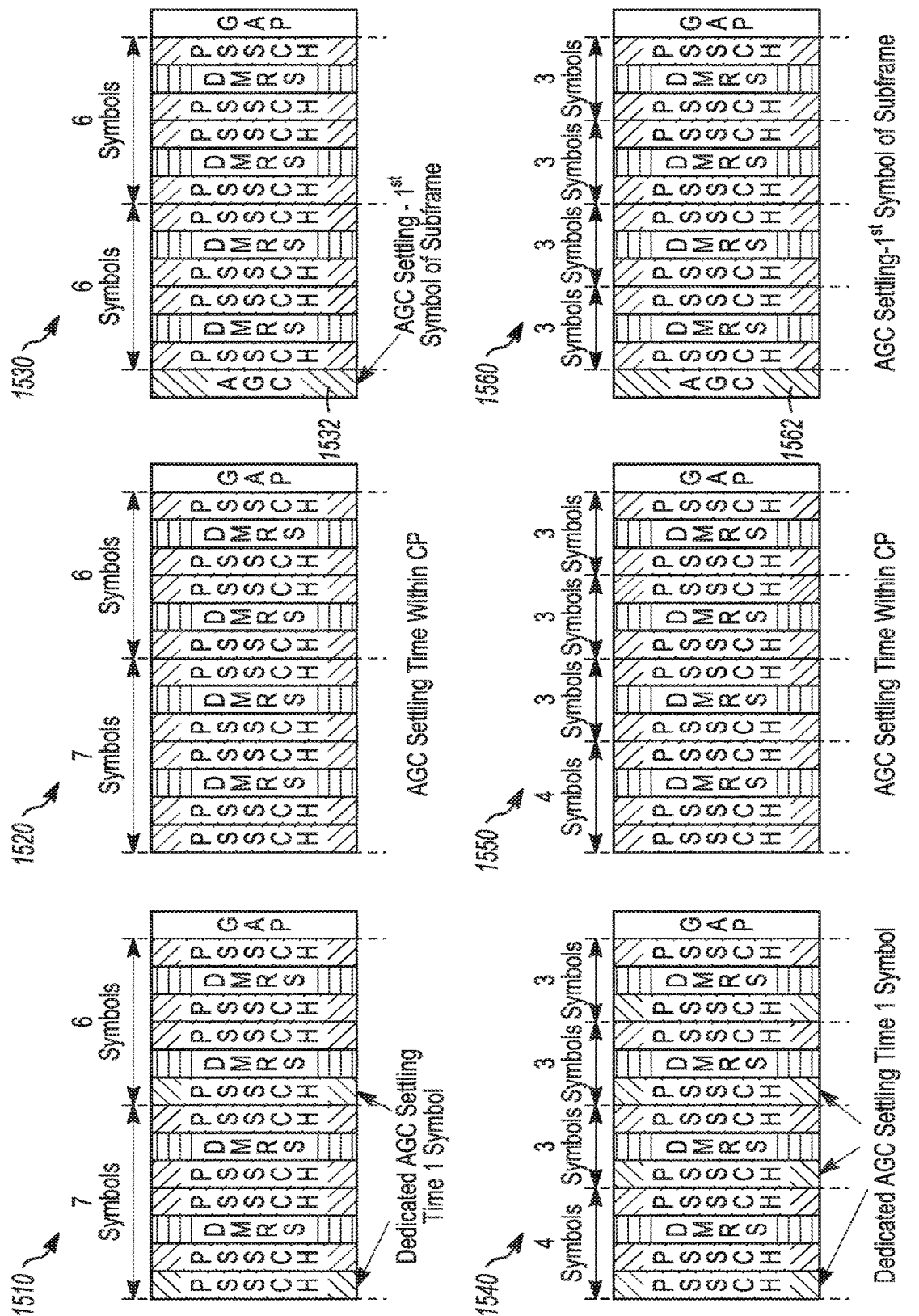
FIG. 15 illustrates example arrangements that may be used in accordance with various TTIs in accordance with some embodiments.

In some embodiments, structures may be aligned with legacy structures. For instance, a structure may be aligned with a legacy LTE (including but not limited to LTE R14) sidelink PSSCH/PSCCH subframe structure. Examples are shown in FIGS. 14 and 15. The structure 1410 is in accordance with a sub-frame granularity and further in accordance with an AGC settling within one symbol duration. The structure 1420 is in accordance with a sub-frame granularity and further in accordance with an AGC settling within a normal cyclic prefix (CP). The structure 1430 is in accordance with a sub-frame granularity and further in accordance with an AGC settling at the first symbol of the sub-frame. This structure includes the AGC symbol 1432.

The structure 1510 is in accordance with a slot granularity (including but not limited to 6 or 7 symbols) and further in accordance with an AGC settling within one symbol duration. The structure 1520 is in accordance with a slot granularity and further in accordance with an AGC settling within a normal cyclic prefix (CP). The structure 1530 is in accordance with a slot granularity and further in accordance with an AGC settling at the first symbol of the sub-frame. This structure includes the AGC symbol 1532.

The structure 1540 is in accordance with a sub-slot granularity (including but not limited to 3 or 4 symbols) and further in accordance with an AGC settling within one symbol duration. The structure 1550 is in accordance with a sub-slot granularity and further in accordance with an AGC settling within a normal cyclic prefix (CP). The structure 1560 is in accordance with a sub-slot granularity and further in accordance with an AGC settling at the first symbol of the sub-frame. This structure includes the AGC symbol 1562.

In some embodiments, including but not limited to cases of arbitrary frame structure, the S-TIs boundaries may not necessarily be aligned with legacy LTE subframe boundaries.

In some embodiments, the S-TTI may be aligned with legacy LTE subframe boundaries. A subframe may include an integer number of S-TTIs. Depending on subframe design and AGC settling time assumptions, the subframe may include one or more of: one or more S-TIs with dedicated AGC settling time within each S-TTI; one or more S-TTIs without dedicated AGC settling time interval; shared AGC settling time interval and S-TTIs without dedicated AGC settling time; and/or other. In addition, the subframe may also include one or more reserved symbols. For instance, such reserved symbol(s) may be used for TX/RX switching, additional reference signal transmission and/or other.

Figure 16:
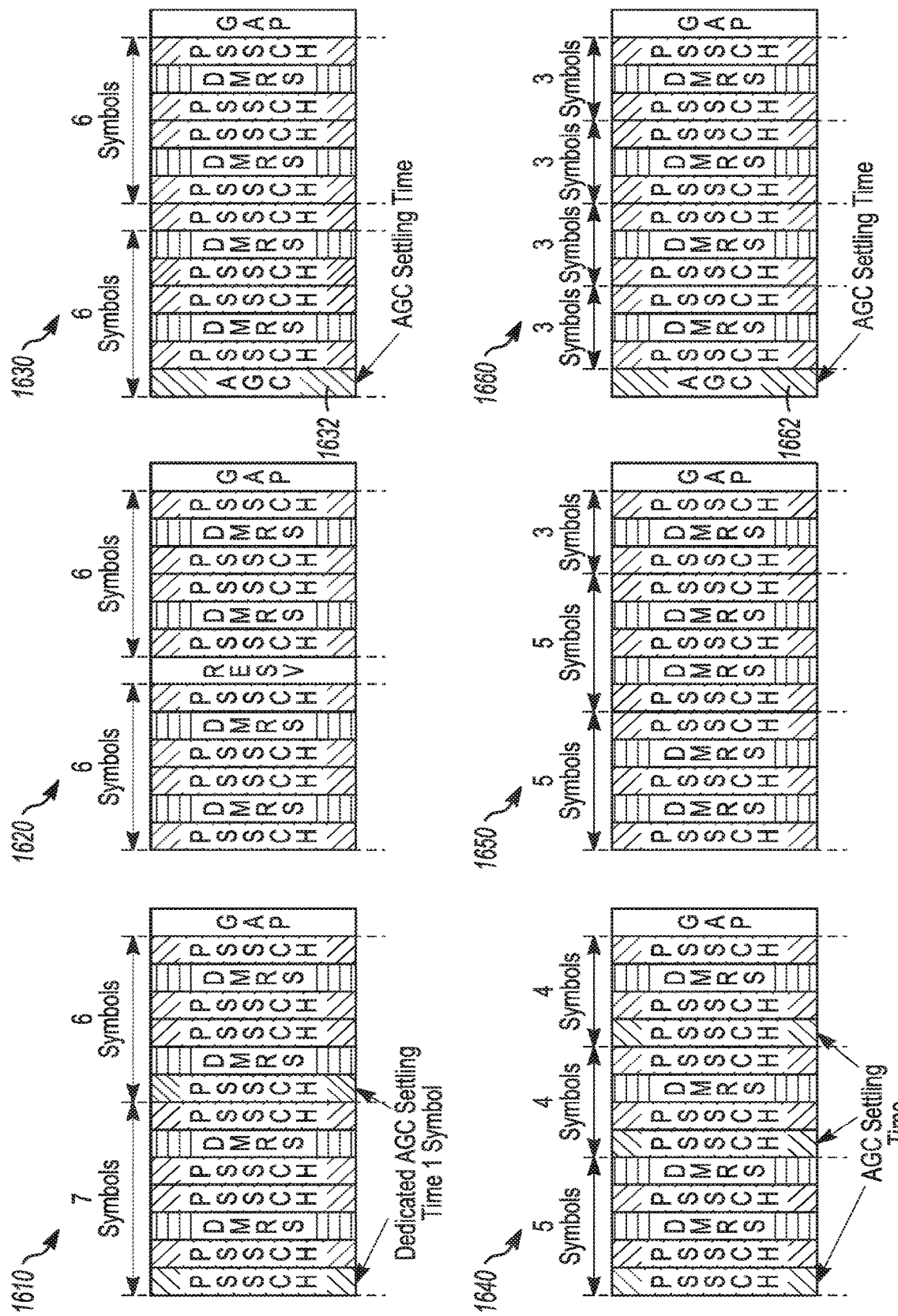
FIG. 16 illustrates example arrangements that may be used in accordance with various TTIs in accordance with some embodiments.

Non-limiting examples of subframe structure construction for subframe with Normal Cyclic Prefix type are shown in FIG. 16. Similar structures may also be constructed for subframes with Extended Cyclic Prefix. The example structures in FIG. 16 may be constructed without legacy subframe structure preservation, in some cases. The structure 1610 is in accordance with a slot granularity (including but not limited to 6 or 7 symbols) and further in accordance with an AGC settling within one symbol duration. The structure 1620 is in accordance with a slot granularity and further in accordance with an AGC settling within a CP. The structure 1630 is in accordance with a slot granularity and further in accordance with an AGC settling at the first symbol of the sub-frame. This structure includes the AGC symbol 1632. The structure 1640 is in accordance with a sub-slot granularity (including but not limited to 3, 4 or 5 symbols) and further in accordance with an AGC settling within one symbol duration. The structure 1650 is in accordance with a slot granularity and further in accordance with an AGC settling within a CP. The structure 1660 is in accordance with a sub-slot granularity and further in accordance with an AGC settling at the first symbol of the sub-frame. This structure includes the AGC symbol 1662.

In some embodiments, S-TTI design without legacy subframe boundaries alignment may be used. In some embodiments, S-TTIs may follow one by one without alignment with legacy subframes boundaries. Similar to other cases described herein, each S-TTI may include a dedicated AGC symbol. Otherwise, the shared AGC symbol may be repeated with a predefined period. Examples of continuous S-TTI design for three different TTI sizes and three different frame structures designed for different AGC operation modes is shown in FIG. 17. The structure 1710 is in accordance with a granularity of a unit that includes a number of symbols and further in accordance with an AGC settling within one symbol duration. The examples in FIG. 17 illustrate constructions in accordance with a slot granularity of three symbols, but any suitable number of symbols may be used. The structure 1720 is in accordance with a granularity of a unit that includes three symbols and further in accordance with an AGC settling within a CP. The structure 1730 is in accordance with a granularity of a unit that includes three symbols and further in accordance with an AGC settling at the first symbol of the sub-frame. This structure includes the AGC symbol 1732.

In some embodiments, the S-TTI structure may be used to broadcast data. In some cases, there may also be some advantages for group-cast and unicast transmissions when fast acknowledgement or response is needed. In some cases, the legacy SCI-F1 transmission may be used to reserve resources for S-TTI transmissions (including but not limited to fast responses). It should be noted that a similar mechanism may be enabled with S-TTI control signaling, but may be incompatible with legacy UEs 102 and may require finer timescale for resource selection.

For instance, in case of two TTI transmissions, the UE 102 supporting S-TTI Tx/Rx may use a first TTI for transmission and may follow the legacy procedure (for instance, usage of legacy PSCCH and PSSCH). The UE 102 may reserve the second TTI and may use it for reception to collect responses from a group of vehicles in S-TTI transmission format. Alternatively, the UE 102 may use legacy PSCCH transmission in combination with the sPSCCH and sPSSCH to reserve resources for fast unicast responses from a group of UEs 102. Examples 1800, 1850 shown in FIG. 18 illustrate such concepts.

In some embodiments, the sPSCCH channel may be used to transmit the resource allocation grants for sPSSCH transmissions. Example 1900 in FIG. 19 illustrates this concept.

In some embodiments, a method of sidelink communication for V2V (vehicle-to-vehicle) communication may include one or more of: configuration of sidelink Short Transmission Time Intervals (S-TTIs) used for communication, configuration of S-TTI based physical sidelink control channel (sPSCCH) and S-TTI physical sidelink shared channel (sPSSCH); configuration of FDM/TDM multiplexing for sPSCCH and sPSSCH transmission; sidelink communication using S-TTI and L-TTI transmission formats within a same set of resources (resource pools); sidelink communication using S-TTI transmission formats on dedicated set of resources; measurements of S-RSSI and PSCCH/PSSCH RSRP based on S-TTI physical structure; sensing and resource selection, for transmission of sidelink shared and control channel based on either S-TTI or L-TTI resource allocations; transmission of two SCI-Formats, one intended to legacy (such as LTE R14) terminals and other intended to enhanced (such as R15) terminals; transmission of SCI to reserve S-TTI resources for transmission by other UEs 102, and/or other.

In some embodiments, the sidelink S-TTI may comprise 1, 2, 3, 4, 5, 6, or 7 symbols including DMRS, and sidelink control or shared channel transmission. The DMRS signal allocation within S-TTI may be predefined according to one of the basic patterns. In some embodiments, sPSCCH and/or sPSSCH physical structures may be defined based on S-TTI structure and transmitted within subframe duration.

In some embodiments, sidelink communication may use S-TTI and L-TTI transmission formats of PSCCH and PSSCH within the same set of resources (resource pools). In some embodiments, one or multiple UEs 102 may use L-TTI transmission format for communication (PSCCH/PSSCH). In some embodiments, one or multiple UEs 102 may use S-TTI transmission format for communication (sPSCCH/sPSSCH). In some embodiments, one or multiple UEs 102 may use S-TTI to transmit two SCI formats, one for legacy UEs 102 (PSSCH) and another for enhanced UEs 102 (PSCCH or sPSCCH). This may enable seamless coexistence within same set of resources, in some cases. In some embodiments, one or multiple UEs 102 may use S-TTI to transmit one or more AGC training symbols at the beginning of each subframe to enable adjustment of AGC for legacy UEs 102. The AGC training symbol(s) may be dedicated AGC signal(s), DMRS, data symbols and/or other. In some embodiments, one or multiple UEs 102 supporting S-TTI may operate using fast AGC, by adjusting AGC at each S-TTI occurrence in time, within cyclic prefix duration.

In some embodiments, S-TTI transmission may be permitted on dedicated resources comprising sPSCCH/sPSSCH resource pools or S-TTI component carriers. In some embodiments, S-RSSI, PSCCH/PSSCH RSRP measurements may be defined for S-TTI structure or configured time granularity. In some embodiments, S-RSSI. PSCCH/PSSCH RSRP measurements defined for S-TTI structure may be used for S-TTI resource selection with finer time granularity. In some embodiments, the UE 102 may select resources for transmission by other UEs 102. In some embodiments, the UE 102 may inform other UEs 102 about S-TTI resources reserved for their transmission using either SC format for legacy UEs 102 and/or enhanced UEs 102.

In some embodiments, the S-TTI may comprise one or more of: a PSCCH signal, a PSSCH signal, an AGC training signal, one or more DMRS and/or other. In some embodiments, the S-TTI structure may be based on one or more basic patterns. In some embodiments, one or more S-TTIs may follow consecutively in time. In some embodiments, an LTE subframe may comprise an integer number of S-TTIs.

In some embodiments, multiple LTE subframes may comprise the same number of S-TTIs. In some embodiments. DMRS transmitted in S-TTIs may be at the same symbols as in an LTE subframe.

In some embodiments, including but not limited to embodiments that include operation in accordance with a 3GPP LTE Release 14 (LTE R14) specification, vehicle-to-vehicle (V2V) communication may be supported. In some cases, periodicities of greater than 100 msec may be used. In some cases, latency of 100 msec or less may be used. In some embodiments, reduced latency (such as 20 msec or other value) may be used. Such a reduced latency may provide challenges in some use cases, including but not limited to use cases which are based on short transmission period and low latency requirement. Accordingly, techniques to enable LTE V2V communication for reduced latency may be beneficial, in some cases. In some embodiments, vehicle-to-everything (V2X) systems may operate in accordance with latencies much smaller than 100 msec.

In some embodiments, techniques may be used to support communication with a relatively short packet generation period and/or relatively low latency. In some embodiments, enhancements may be applied to legacy (including but not limited to LTE R14) V2V sensing and resource selection procedure to support transmission with the reduced latency. For instance, enhancements to sensing window and resource selection window as well as new UE 102 behavior may reduce latency of LTE V2V communication, in some cases.

Figure 20:
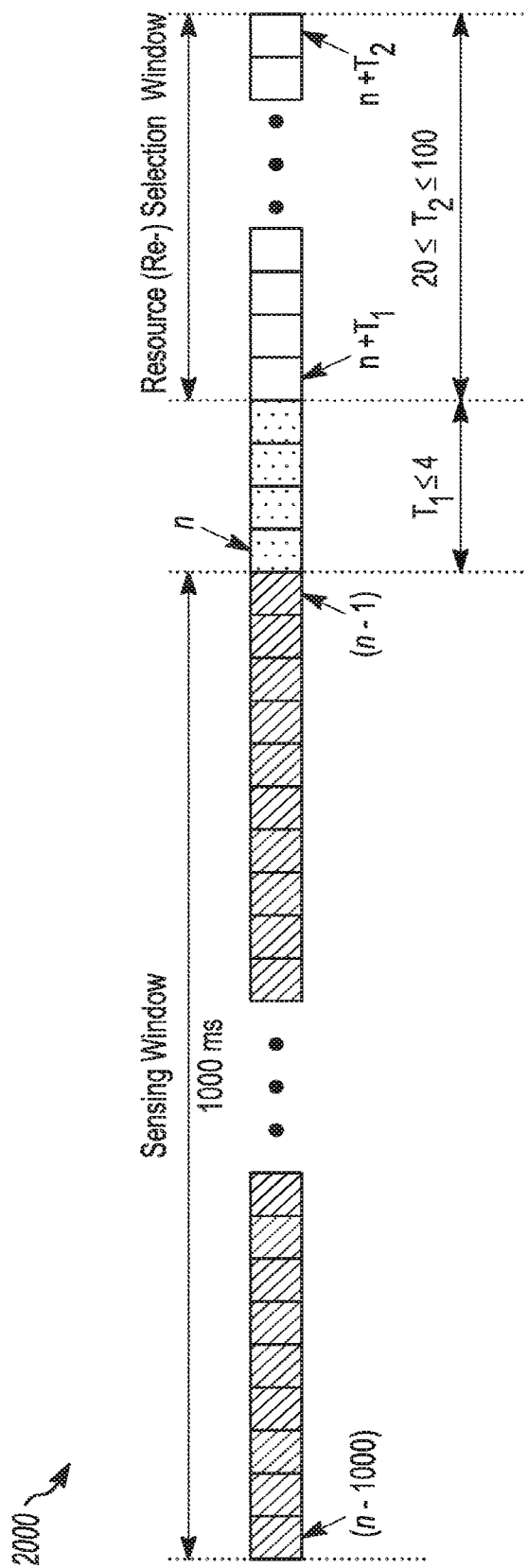
FIG. 20 illustrates example techniques for resource selection in accordance with some embodiments.

In some embodiments, including but not limited to embodiments that include operation in accordance with legacy LTE and/or LTE R14, when requested by higher layers in subframe n, the UE 102 may determine the set of resources for PSCCH/PSSCH transmission. The UE 102 may assume that any resource within the time interval $\lfloor n+T1, n+T2 \rfloor$ corresponds to one candidate single-subframe resource Selections of T1 and T2 may be up to UE 102 implementations under T1≤4 and 20≤T2≤100 restrictions, in some cases. The selection of T2 by the UE 102 may also fulfill a target latency. For resource selection, the UE 102 may monitor subframes $\lfloor n-1000, n-999 \ldots, n-1 \rfloor$ except for those in which its transmissions occur. The UE 102 may perform the resource selection procedure based on PSCCH decoding and/or RSRP, S-RSSI measurements in these subframes. A non-limiting example of LTE legacy V2V resource selection is shown in FIG. 20.

In some embodiments, including but not limited to embodiments that include operation in accordance with legacy LTE and/or LTE R14, a maximum time between packet arrival at L1 and resource selected for transmission may be determined by the value of T2, which may vary from T2 min=20 to T2max=100 and may be subject to latency constraint. Based on a legacy subframe duration of one msec, this approach may enable 20 msec latency and transmission period for V2V communication, in some cases.

In order to further reduce the maximum time between packet arrival at L1 and resource selected for transmission, the min and max value of T2 may be further reduced in a non-limiting example, one or more of the following may be used: T2 min=T1; T2max=10 msec; 4≤T1≤T2≤10.

In a non-limiting example, latencies may vary from 3 msec to 100 msec and specific T2 value may be configured by higher layers, in some use cases. In another non-limiting example, latencies may vary from 10 msec to 20 msec, in some cases. In some cases, latency reduction below 20 msec for resource selection may lead to an increased probability of collision if multiple UEs 102 operate with low latency, including but not limited to latencies of 20 msec or below. This may be due to one or more factors, such as a lack of resources in selection window, half-duplex issues and/or other. In some cases, if latencies such as 20 msec, 10 msec or similar are expected, it may not necessarily be beneficial to mix such transmissions with the transmissions utilizing transmission intervals greater than 100 msec.

In some embodiments, restriction of the resource reservation intervals per pool configuration may be used. However, a sensing window of one second may be used, in some cases. This window size may be independent of pool configuration and the UE 102 may be expected to keep a selected resource for at least half a second in time and thus may consistently collide until the next resource reselection. Accordingly, one or more techniques may be applied to further reduce latency and/or resource reservation period.

In a non-limiting example technique that may be applied to further reduce latency and/or resource reservation period, a pool-specific reference reservation period may be used. For each resource pool the reference reservation period may be signaled. This value may signify a typical expected generation period of the packets transmitted in such pool, in some cases. In this case, parameters for sensing, resource selection and congestion control may be determined based on the reference reservation period value, a transmission time interval value ($T_{TTI}$) and/or other.

Figure 21:
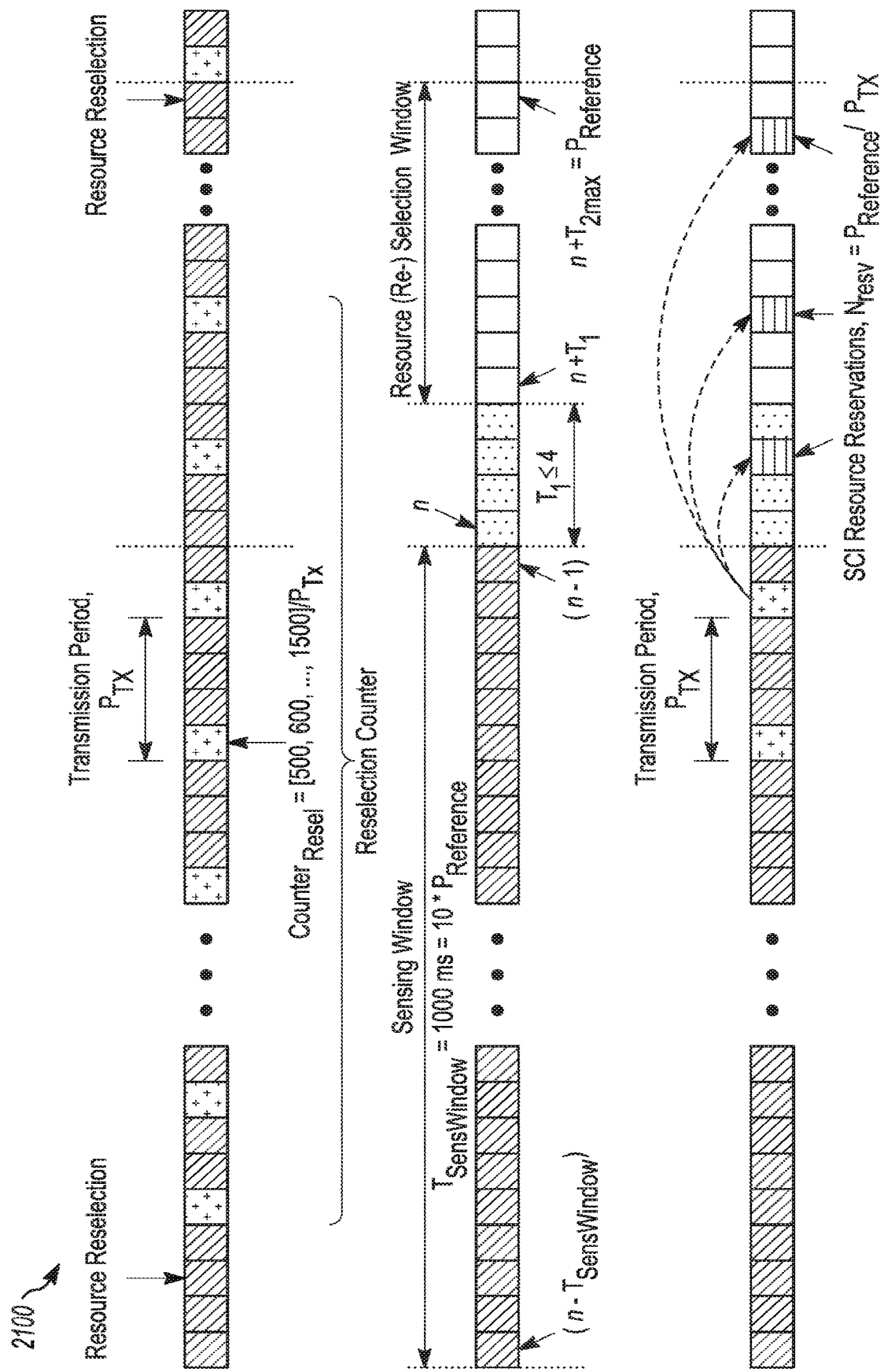
FIG. 21 illustrates example techniques for resource selection in accordance with some embodiments.

In a non-limiting example, a legacy LTE reference resource reservation period may be $P_{Basic}=100$, and a value of $T_{TTI}=$SubframeDuration=1 msec may be used. In this case, the main sensing, resource selection and congestion control parameters may be derived as follows: sensing window duration: $T_{SensWindow}=10*P_{Reference}$; resource selection window $T_{2max}=P_{Reference}$; resource reselection counter range: Counter$_{Reset}=[500, 600, \ldots, 1500]/P_{Tx}$ for $P_{Tx}<P_{Reference}$; maximum number of reservations of other UE within Rx UE resource (re)-selection window: $N_{resv}=P_{Reference}/P_{Tx}$, for $P_{Tx}<P_{Reference}$; $P_{step\_nonTDD}=P_{Reference}$; other Pstep values (which may be determined taking into account DL/UL configuration), congestion control Channel Busy Ratio measurement duration: $T_{CBR}=P_{Reference}$; and/or other. A non-limiting example in FIG. 21 shown LTE sensing and resource selection parameters derivation from reference resource reservation period value.

In another non-limiting example technique that may be applied to further reduce latency and/or resource reservation period, pools restricted to small periods may be used (for instance, restricted to low latency transmissions). This functionality may be enabled by the extension of the list of valid values allowed for LTE R14 parameter "restrictResourceReservarionPeriod" assignment and adding lower values to this field. Embodiments are not limited to usage of this parameter, however, as other parameters and/or messages may be used in some embodiments.

In another non-limiting example technique that may be applied to further reduce latency and/or resource reservation period, a reduced sensing window may be used. In a legacy system (including but not limited to LTE R14), a sensing window of one second may be used independently of periodicity and resource reservation interval used for transmission. The sensing window duration may be shortened for some cases in which only low latency transmission (small resource reservation periods) are configured per resource pool.

In another non-limiting example technique that may be applied to further reduce latency and/or resource reservation period, a reduced resource (re)-selection time may be used. The resource (re)-selection time may be reduced by decreasing the number of TBs transmitted before the resource reselection. For instance, the times may be reduced from [25, 75] for 20 msec in LTE R14 to [5 15] msec if a small resource reservation period is configured per pool. The resource reselection counter values may be configurable per pool.

In another non-limiting example technique that may be applied to further reduce latency and/or resource reservation period, a reduced resource (re)-selection window may be used. The resource (re)-selection window may be bounded, in some cases, by a minimum $T_2$ value equal to 20. If the value of $T_2$ is reduced further, the latency can be decreased accordingly. Therefore values such as 5 or 10 may be used as pre-configuration values or $T_2$ values can be configured by higher layers within predefined bounds, in some embodiments.

In another non-limiting example technique that may be applied to further reduce latency and/or resource reservation period, multiple transmission processes may be used. The utilization of multiple transmission processes with resource selection windows shifted in time may be utilized to reduce the overall transmission latency. In some cases, this approach may reduce latency in an average statistical sense. In some cases, this approach may be applied in combination with other principles to comply with strict latency targets.

In another non-limiting example technique that may be applied to further reduce latency and/or resource reservation period, a "first in time" candidate resource selection may be used. In some embodiments, including but not limited to embodiments that include usage in accordance with LTE R14 and/or other legacy protocol, a resource for transmission may be randomly selected from the set of candidate resources within a resource selection window. Instead of using random resource selection, it may be possible to select the first resource in time among set of candidate resources and thus reduce latency in an average sense.

Figure 22:
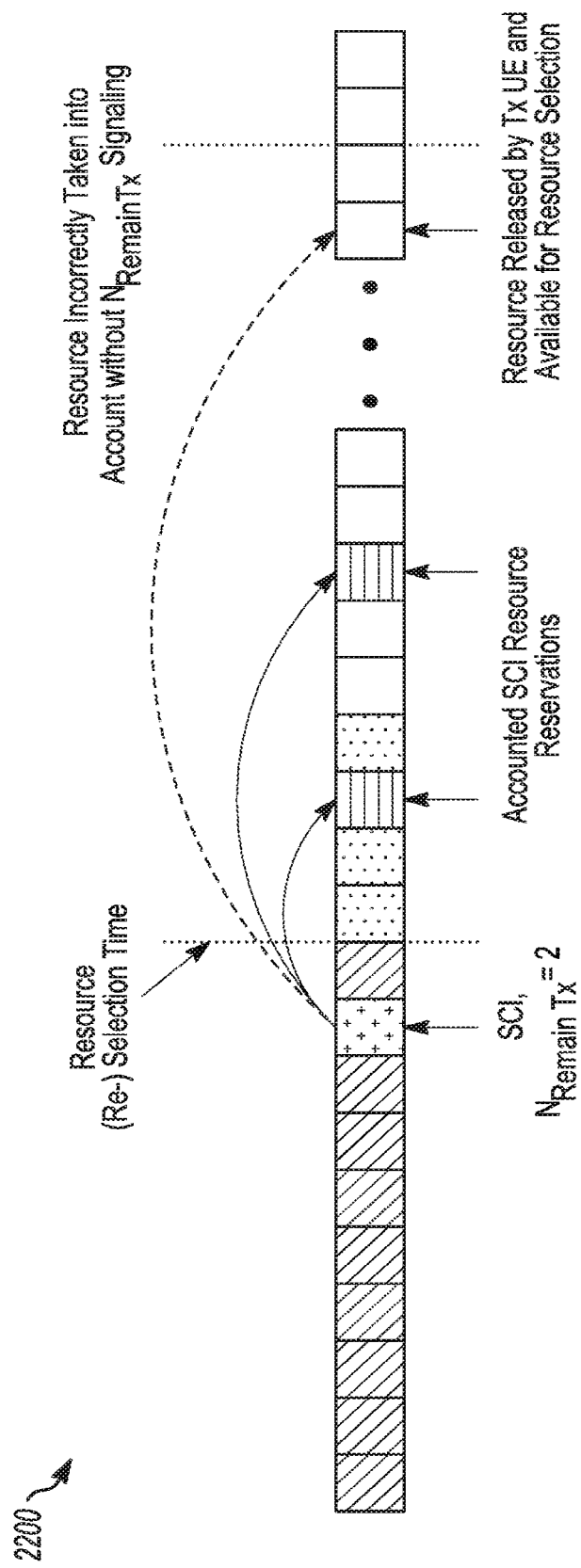
FIG. 22 illustrates example techniques for resource selection in accordance with some embodiments.

In another non-limiting example technique that may be applied to further reduce latency and/or resource reservation period, a number of remaining transmissions may be signaled. This information may be used by UEs 102 performing resource reselection to predict resource occupation and properly select resources. A non-limiting example of LTE sensing and resource selection parameters derivation from basic resource reservation period value is shown in FIG. 22. The UE 102 may be permitted to select a resource currently occupied by another UE 102 if it is informed that the resource will be released by the other UE 102 within the reselection window. If probabilistic resource reselection mechanism is enabled, the UE 102 that transmits the data may check in advance whether resource reselection occurs and may signal the proper value. In order to minimize the signaling overhead, the maximum value may be signaled if a number of remaining transmissions exceeds a predefined threshold. This technique may not necessarily affect latency, but may improve the overall sensing and resource selection performance in some cases.

In another non-limiting example technique that may be applied to further reduce latency and/or resource reservation period, a number of reserved transmissions may be signaled. This information and/or a number of remaining transmissions may be used to determine one or more of: when a resource reservation started; when the resource reservation is expected to end. This information may be beneficial to compensate estimation of the received power at the specific resource if the UE 102 has a reselected resource. The power received from the specific signal source may be subtracted from the total received power if the receiver is aware that the transmitter has already released the resource.

In another non-limiting example technique that may be applied to further reduce latency and/or resource reservation period, a short reservation period signaling in SCI may be used. The resource reservation period may be signaled in SCI using a 'Resource reservation' field. In some embodiments, other techniques for resource reservation signaling in SCI may be used. In a non-limiting example of a technique for resource reservation signaling in SCI, a list of reservation periods may be extended. New reservation periods may be included into the list of supported reservation periods. In this case, the enhanced UEs 102 may be able to correctly decode this field in SCI. The legacy UEs 102 may not be able to detect the resource reservation period correctly, which may negatively affect their resource selection decisions. Accordingly, coexistence of R14 and R15 UEs in the same resource pool may be problematic.

In another non-limiting example of a technique for resource reservation signaling in SCI, a field to scale configured resource reservation value may be used. A 'ResvPeriodScale' field (which may be referred to as "M" below for clarity) or similar may signal a multiplier to be used together with signaled legacy resource reservation period to obtain the actual resource reservation period. The reservation period and scale factor may be selected in accordance with different values for the parameter M. Two non-limiting examples for M are given below. In a first example, M may be an arbitrary value. In this case the enhanced UEs 102 may be able determine resource reservation period correctly. However, the legacy UEs 102 may use the wrong information about resource reservation which may degrade their resource selection performance. In a second example, M may be based on 1/N wherein N may be a downscale factor represented with an integer value. In some cases, the coexistence of enhanced UE PSCCH signaling with legacy UE 102 reception behavior may be achieved. The legacy UE 102 may interpret transmission from a single enhanced UE 102 with short period transmission as N different transmissions from different UEs 102 and may take them into account during sensing and resource selection.

Figure 23:
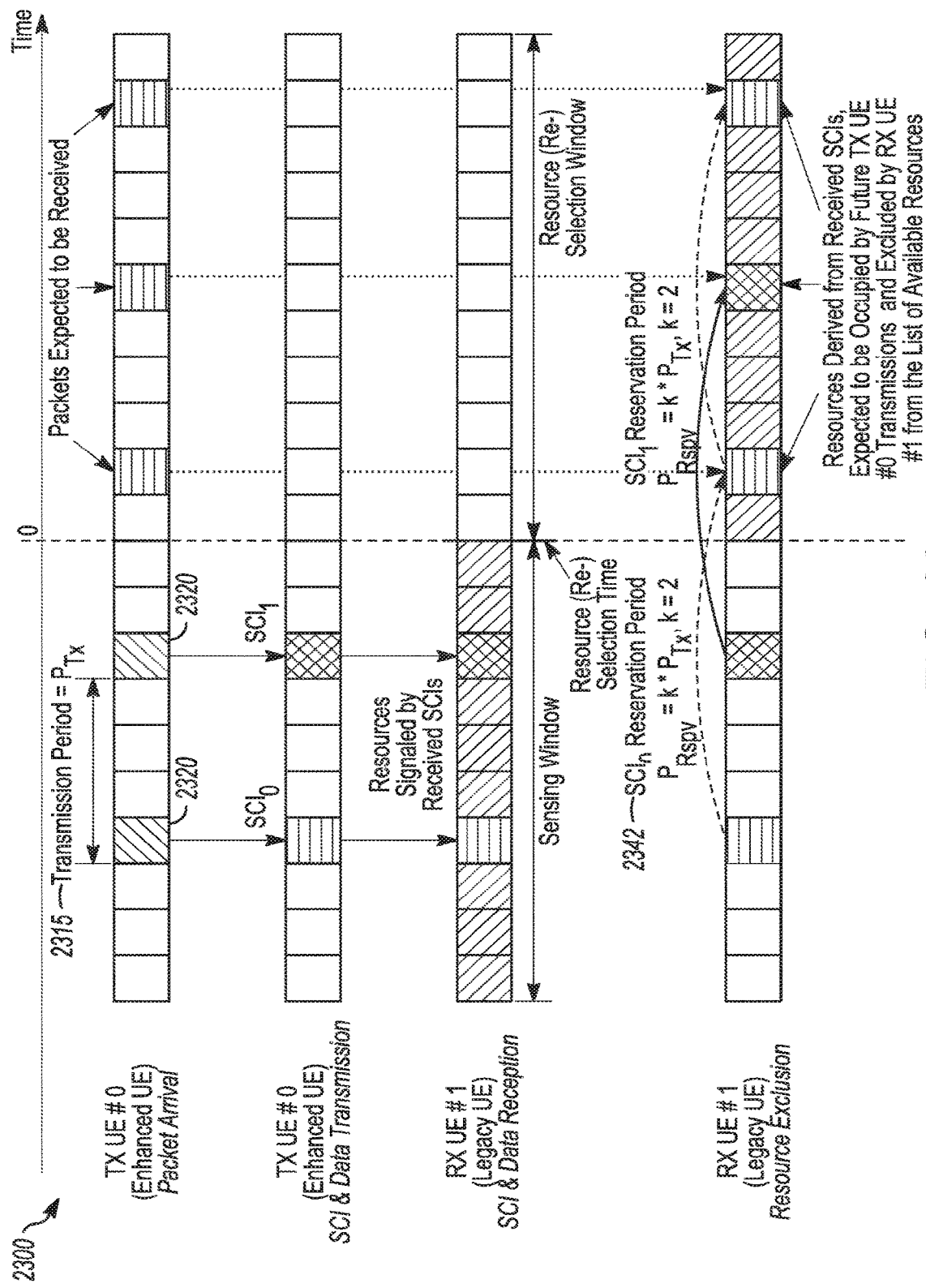
FIG. 23 illustrates example techniques for resource selection in accordance with some embodiments.

A non-limiting example of small period resource signaling compatible with legacy UE sensing and resource selection procedures is shown in FIG. 23. As it is shown in FIG. 23, the Enhanced UE 102 transmission with short transmission period $P_{Tx}$ 2315 is transmitted with two SCI processes 2320, each with signaled legacy reservation period $P_{Rsvp}$, 2342 but actual transmission period two times less.

In some embodiments, in addition to the resource reselection procedure based on processing of long sensing window, the short term sensing at the beginning of each subframe (for instance the first symbol of the sub-frame) may be used. The UE 102 may be permitted to transmit in a specific subframe if short term sensing results indicate that received power in a whole symbol or particular sub-channel of the first symbol is below a threshold and/or the received power estimate of the selected candidate resource.

In some embodiments, a congestion control mechanism may be based on one or more metrics, including but not limited to those described below. In a first example metric, a channel busy ratio (CBR) measured in subframe n may be defined for the PSSCH. PSCCH and/or other. For the PSSCH, the portion of sub-channels in the resource pool for which an S-RSSI measured by the UE 102 exceeds a threshold sensed over a range of subframes. A non-limiting example range includes subframes [n−100, n−1]. Ranges of other sizes may be used. For the PSCCH, in a pool that is configured such that PSCCH may be transmitted with its corresponding PSSCH in non-adjacent resource blocks, the portion of the resources of the PSCCH pool whose S-RSSI measured by the UE exceed a threshold sensed over a range of subframes may be used. A non-limiting example range includes subframes [n−100, n−1]. Ranges of other sizes may be used. It may be assumed, in some cases, that the PSCCH pool includes resources with a size of two consecutive PRB pairs in the frequency domain.

In a second example metric, a channel occupancy ratio (CR) evaluated at subframe n may be defined as a total number of sub-channels used for its transmissions in subframes [n−a, n−I] and granted in subframes [n, n+b] divided by the total number of configured sub-channels in the transmission pool over [n−a, n+b]. In some embodiments, the parameter a may be a positive integer and b may be a non-negative integer. In a non-limiting example, a and b may be determined by UE implementation with a+b+1=1000, a>=500. In addition, b may be selected such that (n+b) does not exceed the last transmission opportunity of the grant for the current transmission, in some embodiments.

In some embodiments, a congestion control design may be based on management of the traffic with 100 msec latency and packet generation period ≥100 msec. In a non-limiting example, the CBR measurement duration may be selected as 100 msec and the CR estimation interval may be equal to one second.

In some embodiments, if the packet transmission period is significantly shorter than 100 msec, the correlated CBR measurements that are performed before each transmission may be observed. To overcome this issue, the reduced CBR measurement duration for short period communication may be used. For instance, for 20 msec packet generation period, $T_{CBR}$=20 msec or below (for instance 10 msec) may be used.

In some embodiments, if the short period transmissions are configured in a resource pool, a duration of one second may be excessive for CR estimation. For that case, the CR estimation duration may also be reduced proportionally, in some cases.

In some embodiments, a method of sidelink vehicle-to-vehicle (V2V) communication may be performed. In some cases, low latency and short transmission period may be used and/or realized, although the scope of embodiments is not limited in this respect. The method may comprise one or more of: configuration of resource pool sensing window, resource selection window and congestion measurement parameters; selection, by a UE 102, of resources for low latency/short period transmission with multiple resource selection windows, signaling, by the UE 102, of one or more resource reservation parameters in SCI. In some embodiments, the reference resource reservation period may be configured per pool representing the dominant transmission period. In some embodiments, resource selection, sensing and congestion control parameters may be derived from the configured reference resource reservation period. In some embodiments, the pool may be configured with restriction on UE 102 resource reservation period. For instance, values of 20, 10 and/or 5 msec may be used.

In some embodiments, a sensing window duration may be configured per resource pool. In some embodiments, the sensing window duration may depend on permitted resource reservation periods (or reference resource reservation period). In some embodiments, the sensing window duration may be smaller than one second in duration. In some embodiments, a minimum duration of the resource selection window measured from resource reselection trigger may be less than 20 msec (for instance, 5 or 10 msec or below and/or values configured by higher layers).

In some embodiments, multiple "shifted in time" resource selection windows may be configured. In some embodiments, the largest time shift between resource selection windows may be not larger than a packet generation period divided by a number. In some embodiments, the resource from resource selection window with smaller time distance measured from resource reselection trigger instance may be selected with higher priority. In some embodiments, a first in time resource may be selected for transmission among candidate set of resources. In some embodiments, a number of remaining reserved transmissions may be signaled within SCI forgiven resource reservation process. In some embodiments, a total number of reserved transmissions may be signaled within SCI. In some embodiments, the short reservation period may be signaled within SCI.

In some embodiments, the signaling may be implemented with a resource reservation value signaled within SCI. In some embodiments, the signaling may be implemented in a backward compatible way with additional field in SCI representing the scale applied to a legacy (including but not limited to LTE R14) reservation period. The additional field may be used to calculate actual reservation period in order to make it compatible with legacy sensing and resource selection behavior.

In some embodiments, a scale factor signaled in SCI may be an arbitrary value. In some embodiments, a scale factor signaled in SCI may represent a number to be used for a quotient (such as of the form 1/N).

In some embodiments, a reduced channel busy ratio measurement duration may be configured per pool. In some embodiments, a channel busy ratio measurement duration may be less than 100 msec. In some embodiments, a reduced (such as less than one second or other value) channel occupancy ratio estimation interval may be configured per pool or derived from the actual sensing window duration. In some embodiments, the channel occupancy ratio estimation interval may be less than one second. In some embodiments, the channel occupancy ratio estimation interval may be derived from a sensing window duration.

In Example 1, an apparatus of a User Equipment (UE) may comprise memory. The apparatus may further comprise processing circuitry. The processing circuitry may be configured to select, from a plurality of short transmission time intervals (TTIs), a short TTI for a vehicle-to-vehicle (V2V) sidelink transmission by the UE. The short TTIs may occur within a legacy TTI. The short TTIs may be allocated for V2V sidelink transmissions by non-legacy UEs and the legacy TTI may be allocated for V2V sidelink transmissions by legacy UEs. The processing circuitry may be further configured to encode, for transmission in accordance with the legacy TTI, a legacy physical sidelink control channel (PSCCH) to indicate, to legacy UEs, the V2V sidelink transmission by the UE. The processing circuitry may be further configured to encode, for transmission in accordance with the selected short TTI, a short PSCCH (sPSCCH) to indicate, to non-legacy UEs, the V2V sidelink transmission by the UE. The memory may be configured to store information that identifies the selected short TTI.

In Example 2, the subject matter of Example 1, wherein the processing circuitry may be further configured to encode, for the V2V sidelink transmission by the UE, a short physical sidelink shared channel (sPSSCH) based on a block of data bits. The sPSSCH may be encoded for transmission in accordance with the selected short TTI. The sPSSCH and the sPSCCH may be encoded for transmission in separate frequency resources in accordance with a frequency division multiplexing (FDM) technique.

In Example 3, the subject matter of one or any combination of Examples 1-2, wherein the processing circuitry may be further configured to encode, for the V2V sidelink transmission by the UE, a short physical sidelink shared channel (sPSSCH) based on a block of data bits. The sPSSCH may be encoded for transmission, in accordance with a time division multiplexing (TDM) technique, in a short TTI that occurs after the selected short TTI.

In Example 4, the subject matter of one or any combination of Examples 1-3, wherein the processing circuitry may be further configured to encode the legacy PSCCH for transmission in first frequency resources allocated for V2V sidelink transmissions by legacy UEs. The processing circuitry may be further configured to encode the sPSCCH for transmission in second frequency resources allocated for V2V sidelink transmissions by non-legacy UEs.

In Example 5, the subject matter of one or any combination of Examples 1-4, wherein the processing circuitry further configured to determine one or more sensing or signal quality measurements for the plurality of short TTIs based on one or more channel sense operations prior to the legacy TTI. The processing circuitry may be further configured to select the short TTI for the V2V sidelink transmission by the UE based at least partly on the sensing or signal quality measurements.

In Example 6, the subject matter of one or any combination of Examples 1-5, wherein the legacy TTI may span one millisecond (msec). The plurality of short TTIs may include four short TTIs.

In Example 7, the subject matter of one or any combination of Examples 1-6, wherein the selected short TTI may span a plurality of symbol periods. At least one of the symbol periods may be based on demodulation reference signals (DMRS). At least one of the symbol periods may be based on data bits.

In Example 8, the subject matter of one or any combination of Examples 1-7, wherein the processing circuitry may be further configured to encode, for transmission in a first chronological symbol period of the legacy TTI, an automatic gain control (AGC) element to enable AGC at legacy UEs in a shared AGC symbol.

In Example 9, the subject matter of one or any combination of Examples 1-8, wherein the processing circuitry may be further configured to encode the AGC element for transmission in the first chronological symbol period of the legacy TTI independent of a position of the selected TTI within the legacy TTI.

In Example 10, the subject matter of one or any combination of Examples 1-9, wherein the sPSCCH may include a sidelink control information (SCI) that indicates first information related to the V2V sidelink transmission by the UE. The legacy PSCCH may include a sidelink control information (SCI) format-1 (SCI-F1) indicates second information related to the V2V sidelink transmission by the UE.

In Example 11, the subject matter of one or any combination of Examples 1-10, wherein the processing circuitry may be further configured to set a duration of a resource selection window according to a latency criteria, wherein the latency criteria is less than or equal to 20 milliseconds.

In Example 12, the subject matter of one or any combination of Examples 1-11, wherein the apparatus may further include a transceiver to transmit the legacy PSCCH and the sPSCCH.

In Example 13, the subject matter of one or any combination of Examples 1-12, wherein the processing circuitry may include a baseband processor to select the short TTI.

In Example 14, a computer-readable storage medium may store instructions for execution by one or more processors to perform operations for communication by a User Equipment (UE). The operations may configure the one or more processors to select, from candidate resource pools, a resource pool for a vehicle-to-vehicle (V2V) sidelink transmissions by the UE. Sub-frames of different candidate resource pools may be non-overlapping. The candidate resource pools may be allocated for V2V transmissions of different latencies per candidate resource pool. The operations may further configure the one or more processors to, during a sensing window before the selected resource pool, attempt to detect V2V sidelink transmissions by other UEs. The operations may further configure the one or more processors to determine, based on sidelink control information (SCI) included in V2V sidelink transmissions detected in the sensing window, one or more candidate sub-frames of a resource selection window available for the V2V sidelink transmission by the UE. The resource selection window may be subsequent to the sensing window.

In Example 15, the subject matter of Example 14, wherein the operations may further configure the one or more processors to select, from the candidate sub-frames, one or more sub-frames for the V2V sidelink transmission by the UE in the resource selection window. The operations may further configure the one or more processors to encode, for transmission in the selected sub-frames, a physical sidelink shared channel (PSSCH) based on a block of data bits.

In Example 16, the subject matter of one or any combination of Examples 14-15, wherein the operations may further configure the one or more processors to select the one or more sub-frames for V2V sidelink transmissions by the UE in multiple resource selection windows that are shifted in time.

In Example 17, the subject matter of one or any combination of Examples 14-16, wherein the operations may further configure the one or more processors to select the one or more sub-frames to include the candidate sub-frame that is earliest in the resource selection window.

In Example 18, the subject matter of one or any combination of Examples 14-17, wherein the candidate resource pools may be configured for sensing windows of different durations. The durations may be based at least partly on reservation periods of the candidate resource pools.

In Example 19, the subject matter of one or any combination of Examples 14-18, wherein the operations may further configure the one or more processors to determine one or more signal quality or sensing measurements during the sensing window. The operations may further configure the one or more processors to determine the candidate sub-frames based at least partly on the signal quality or sensing measurements.

In Example 20, the subject matter of one or any combination of Examples 14-19, wherein the resource pool may include multiple sub-channels per sub-frame. The signal quality or sensing measurements may include a channel busy ratio (CBR) based at least partly on a ratio, for the sub-channels during a window of sub-frames, of: a total number of sub-channels for which a signal quality measurement is above a threshold, and a total number of sub-channels.

In Example 21, the subject matter of one or any combination of Examples 14-20, wherein the operations may further configure the one or more processors to select the resource pool from the candidate resource pools based at least partly on: a target latency of the V2V sidelink transmission by the UE, and the different latencies per candidate resource pool.

In Example 22, the subject matter of one or any combination of Examples 14-21, wherein the resource selection window may span a range between: a first configurable value between zero and four milliseconds (msec), and a second configurable value between the first configurable value and 20 msec.

In Example 23, an apparatus of a User Equipment (UE) may comprise memory. The apparatus may further comprise processing circuitry. The processing circuitry may be configured to select, from a plurality of short transmission time intervals (TTIs), a short TTI for a vehicle-to-vehicle (V2V) sidelink transmission by the UE. A legacy TTI may be divided to include the short TTIs. The processing circuitry may be further configured to encode, for transmission in accordance with the selected short TTI, a short physical sidelink control channel (sPSCCH) to indicate the V2V sidelink transmission by the IE. The processing circuitry may be further configured to encode, for transmission in accordance with the selected short TTI, a short physical sidelink shared channel (sPSCCH) based on a block of data bits. The processing circuitry may be further configured to encode, for transmission in a first chronological symbol period of the legacy TTI, an automatic gain control (AGC) element to enable AGC at legacy UEs or non-legacy UEs. The memory may be configured to store information that identifies the short TTI.

In Example 24, the subject matter of Example 23, wherein the short TTIs may be allocated for V2V sidelink transmissions by non-legacy UEs. The legacy TTI may be allocated for V2V sidelink transmissions by legacy UEs.

In Example 25, the subject matter of one or any combination of Examples 23-24, wherein the legacy TTI may span one millisecond (msec). The plurality of short TTIs may include four short TTIs.

In Example 26, the subject matter of one or any combination of Examples 23-25, wherein the selected short TTI may span a plurality of symbol periods. At least one of the symbol periods may be based on demodulation reference signals (DMRS). At least one of the symbol periods may be based on a block of data bits.

In Example 27, the subject matter of one or any combination of Examples 23-26, wherein the processing circuitry may be further configured to encode the AGC element for transmission in the first chronological symbol period of the legacy TTI independent of a position of the selected TTI within the legacy TTI.

In Example 28, an apparatus of a User Equipment (UE) may comprise means for selecting, from candidate resource pools, a resource pool for a vehicle-to-vehicle (V2V) sidelink transmissions by the UE. Sub-frames of different candidate resource pools may be non-overlapping. The candidate resource pools may be allocated for V2V transmissions of different latencies per candidate resource pool. The apparatus may further comprise means for, during a sensing window before the selected resource pool, attempting to detect V2V sidelink transmissions by other UEs. The apparatus may further comprise means for determining, based on sidelink control information (SCI) included in V2V sidelink transmissions detected in the sensing window, one or more candidate sub-frames of a resource selection window available for the V2V sidelink transmission by the UE. The resource selection window may be subsequent to the sensing window.

In Example 29, the subject matter of Example 28, wherein the apparatus may further comprise means for selecting, from the candidate sub-frames, one or more sub-frames for the V2V sidelink transmission by the UE in the resource selection window. The apparatus may further comprise means for encoding, for transmission in the selected sub-frames, a physical sidelink shared channel (PSSCH) based on a block of data bits.

In Example 30, the subject matter of one or any combination of Examples 28-29, wherein the apparatus may further comprise means for selecting the one or more sub-frames for V2V sidelink transmissions by the UE in multiple resource selection windows that are shifted in time.

In Example 31, the subject matter of one or any combination of Examples 28-30, wherein the apparatus may further comprise means for selecting the one or more sub-frames to include the candidate sub-frame that is earliest in the resource selection window.

In Example 32, the subject matter of one or any combination of Examples 28-31, wherein the candidate resource pools may be configured for sensing windows of different durations. The durations may be based at least partly on reservation periods of the candidate resource pools.

In Example 33, the subject matter of one or any combination of Examples 28-32, wherein the apparatus may further comprise means for determining one or more signal quality or sensing measurements during the sensing window. The apparatus may further comprise means for determining the candidate sub-frames based at least partly on the signal quality or sensing measurements.

In Example 34, the subject matter of one or any combination of Examples 28-33, wherein the resource pool may include multiple sub-channels per sub-frame. The signal quality or sensing measurements may include a channel busy ratio (CBR) based at least partly on a ratio, for the sub-channels during a window of sub-frames, of: a total number of sub-channels for which a signal quality measurement is above a threshold, and a total number of sub-channels.

In Example 35, the subject matter of one or any combination of Examples 28-34, wherein the apparatus may further comprise means for selecting the resource pool from the candidate resource pools based at least partly on, a target latency of the V2V sidelink transmission by the UE, and the different latencies per candidate resource pool.

In Example 36, the subject matter of one or any combination of Examples 28-35, wherein the resource selection window may span a range between: a first configurable value between zero and four milliseconds (msec), and a second configurable value between the first configurable value and 20 msec.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. A user equipment (UE), comprising:
memory; and
processing circuitry in communication with the memory and configured to:
select a sidelink resource for sidelink transmission; and
transmit the sidelink transmission on the selected sidelink resource, wherein the sidelink transmission includes an initial orthogonal frequency division multiplexing (OFDM) symbol, wherein the initial OFDM symbol is a copy of a second OFDM symbol, wherein the second OFDM symbol immediately follows the initial OFDM symbol, wherein the second OFDM symbol includes at least one of a physical sidelink shared data channel or a physical sidelink control channel, and wherein, when the sidelink transmission includes 6 symbols or 7 symbols, a second symbol and a sixth symbol of the sidelink transmission are demodulation reference signals (DM-RS).

2. The UE of claim 1,
wherein the processing circuitry is further configured to:
reserve a first set of resources for the sidelink transmission; and
reserve a second set of resources for a second transmission process, wherein the first set of resources and the second set of resources are shifted in time with respect to one another.

3. The UE of claim 1,
wherein the processing circuitry is further configured to:
transmit information for reservation for resources for the sidelink transmission to a second UE.

4. The UE of claim 3,
wherein the information for the reservation of resources for the sidelink transmission to the second UE further includes resources for an acknowledgment to be received from the second UE.

5. The UE of claim 1,
wherein the processing circuitry is further configured to:
sense resources during a sensing window.

6. The UE of claim 1,
wherein the sidelink resource is selected from a resource pool.

7. The UE of claim 6,
wherein the resource pool includes time resources and frequency resources.

8. A method for transmitting a sidelink transmission, comprising:
a user equipment,
selecting a sidelink resource for sidelink transmission; and
transmitting the sidelink transmission on the selected sidelink resource, wherein the sidelink transmission includes an initial orthogonal frequency division multiplexing (OFDM) symbol, wherein the initial OFDM symbol is a copy of a second OFDM symbol, wherein the second OFDM symbol immediately follows the initial OFDM symbol, wherein the second OFDM symbol includes at least one of a physical sidelink shared data channel or a physical sidelink control channel, and wherein, when the sidelink transmission includes 6 symbols or 7 symbols, a second symbol and a sixth symbol of the sidelink transmission are demodulation reference signals (DM-RS).

9. The method of claim 8, further comprising:
the UE,
reserving a first set of resources for the sidelink transmission; and
reserving a second set of resources for a second transmission process, wherein the first set of resources and the second set of resources are shifted in time with respect to one another.

10. The method of claim 8, further comprising:
the UE,
transmitting information for reservation for resources for the sidelink transmission to a second UE.

11. The method of claim 10,
wherein the information for the reservation of resources for the sidelink transmission to the second UE further includes resources for an acknowledgment to be received from the second UE.

12. The method of claim 8, further comprising:
the UE,
sensing resources during a sensing window.

13. The method of claim 8,
wherein the sidelink resource is selected from a resource pool.

14. The method of claim 13,
wherein the resource pool includes time resources and frequency resources.

15. A non-transitory computer-readable storage medium that stores instructions for execution by one or more processors to perform operations for communication by a user equipment (UE), the operations to configure the one or more processors to:
select a sidelink resource for sidelink transmission; and
transmit the sidelink transmission on the selected sidelink resource, wherein the sidelink transmission includes an initial orthogonal frequency division multiplexing (OFDM) symbol, wherein the initial OFDM symbol is a copy of a second OFDM symbol, wherein the second OFDM symbol immediately follows the initial OFDM symbol, wherein the second OFDM symbol includes at least one of a physical sidelink shared data channel or a physical sidelink control channel, and wherein, when the sidelink transmission includes 6 symbols or 7 symbols, a second symbol and a sixth symbol of the sidelink transmission are demodulation reference signals (DM-RS).

16. The non-transitory computer-readable storage medium of claim 15,
wherein the operations further configure the one or more processors to:
reserve a first set of resources for the sidelink transmission; and
reserve a second set of resources for a second transmission process, wherein the first set of resources and the second set of resources are shifted in time with respect to one another.

17. The non-transitory computer-readable storage medium of claim 15,
wherein the operations further configure the one or more processors to:
transmit information for reservation for resources for the sidelink transmission to a second UE, wherein the information for the reservation of resources for the sidelink transmission to the second UE further includes resources for an acknowledgment to be received from the second UE.

18. The non-transitory computer-readable storage medium of claim 15,
wherein the operations further configure the one or more processors to:
sense resources during a sensing window.

19. The non-transitory computer-readable storage medium of claim 15,
wherein the sidelink resource is selected from a resource pool.

20. The non-transitory computer-readable storage medium of claim 19, wherein the resource pool includes time resources and frequency resources.

\* \* \* \* \*